US006580229B2

(12) United States Patent
Murakami et al.

(10) Patent No.: US 6,580,229 B2
(45) Date of Patent: Jun. 17, 2003

(54) DISCHARGE LAMP LIGHTING DEVICE

(75) Inventors: Yoshinobu Murakami, Hirakata (JP); Joji Oyama, Takaishi (JP); Toshiya Kanja, Uji (JP); Shigeru Ido, Shijonawate (JP); Naokage Kishimoto, Hirakata (JP)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 10/048,973

(22) PCT Filed: Jun. 13, 2001

(86) PCT No.: PCT/JP01/05025

§ 371 (c)(1), (2), (4) Date: Feb. 14, 2002

(87) PCT Pub. No.: WO01/97573

PCT Pub. Date: Dec. 20, 2001

(65) Prior Publication Data

US 2002/0105283 A1 Aug. 8, 2002

(30) Foreign Application Priority Data

Jun. 14, 2000 (JP) ....................................... 2000-178447

(51) Int. Cl.[7] ........................... H05B 37/02; H02M 5/45

(52) U.S. Cl. ................... 315/224; 315/209 R; 315/246; 315/276; 315/291; 315/324; 363/37; 363/34; 363/17

(58) Field of Search ............................ 315/224, 200 R, 315/209 R, 246, 276, 291, 307, 312, 324, DIG. 2, DIG. 7; 363/37, 34, 17, 98, 131–133

(56) References Cited

U.S. PATENT DOCUMENTS

| | | | | |
|---|---|---|---|---|
| 4,498,031 A | * | 2/1985 | Stupp et al. | 315/307 |
| 6,057,652 A | * | 5/2000 | Chen et al. | 315/307 |
| 6,075,715 A | * | 6/2000 | Maehara et al. | 363/37 |
| 6,118,224 A | * | 9/2000 | Murakami et al. | 315/244 |

FOREIGN PATENT DOCUMENTS

| | | |
|---|---|---|
| JP | 8-167484 | 6/1996 |
| JP | 8-251942 | 9/1996 |
| JP | 8-264293 | 10/1996 |
| JP | 2000-100587 | 4/2000 |

* cited by examiner

*Primary Examiner*—Don Wong
*Assistant Examiner*—Tuyet T. Vo
(74) *Attorney, Agent, or Firm*—Oblon, Spivak, McClelland, Maier & Neustadt, P.C.

(57) ABSTRACT

A discharge lamp driving device capable of detecting a lamp life end reliably in a high or low temperature environment for circuit protection, yet preventing the occurrence of the cataphoresis phenomenon. Impedance elements Z1 and Z1 are inserted respectively between one filament ends of individual discharge lamps La1 and La2 and a node (the ground) having no high frequency amplitude in order to detect a difference between AC components of individual lamp voltages VLa1 and VLa2 in closed loops of the discharge lamps La1 and La2 and the impedance elements Z1 and Z1 in order to judge whether or not the depletion of the emitter occurs. Thus, it is possible to reliably judge the presence of abnormality even when the amplitudes of the lamp voltages VLa1 and VLa2 varies in a range of low to high temperature. Also, since there is no need to provide a DC blocking capacitor to a secondary winding N2 of a leakage transformer LT1, the discharge lamps La1 and La2 can be free from the DC component so as to be prevented from causing the cataphoresis phenomenon.

18 Claims, 23 Drawing Sheets

DISCHARGE LAMP LIGHTING DEVICE

TECHNICAL FIELD

The present invention is directed to a discharge lamp driving device with an abnormality detection and protection function of detecting a lamp life end for circuit protection.

BACKGROUND ART (First Prior Art)

FIG. 1 s a circuit diagram showing one example of a prior discharge lamp driving device which is identical in circuit configuration to that shown in FIG. 36 of Japanese Patent Publication No. 8-251942. A rectifier DB composed of a diode bridge is connected to an AC power source AC through a surge absorption element ZNR and a filter circuit F. Connected across a pulsating output terminals are a high frequency bypassing capacitor C2, a series combination of switching elements Q1 and Q2 in the form of field effect transistors through a series circuit of diodes D5 and D6, a series combination of a smoothing capacitor C10 and a diode 13, and a high frequency bypassing capacitor C11. A series circuit of an inductor L2 and a diode D12 is connected between a connection point of switching elements Q1 and Q2 and a connection point of smoothing capacitor C10 and diode D13. A leakage transformer LT1 has a primary winding N1 that is connected in series with a DC blocking capacitor C3 between the cathode of diode D5 and the connection point of switching elements Q1 and Q2. A secondary winding N2 of the leakage transformer LT1 has its one end connected through a DC blocking capacitor C9 to one of filaments of one discharge lamp La1, and has its other end connected to one of filament of the other discharge lamp La2. The other filaments of the two discharge lamps La1 and La2 are connected at one ends thereof to each other through an auxiliary winding N3 of the leakage transformer LT1 and a DC blocking capacitor C6. The other ends of the filaments of the discharge lamps La1 and La2 are connected to each other through a resonant inducing capacitor C7. Further, a harmonic distortion improving capacitor C4 is connected across diode D6.

The two switching elements Q1 and Q2 are driven by a control circuit CNT to turn on and off alternately. The leakage transformer LT1 includes an auxiliary winding N4 for detection of lamp voltage of the discharge lamps La1 and La2. The detected voltage induced at the auxiliary winding N4 is rectified by means of a diode D8 and is fed to a detection circuit 20 for detection of the lamp voltage. Based upon thus detected lamp voltage, the control circuit CNT varies a switching frequency of the switching elements Q1 and Q2. In short, the source AC voltage is rectified through rectifier DB of which pulsating output is partially smoothed out by a valley-filling power source in the form of a step-down chopper circuit composed of switching element Q2, diode D12, inductor L2, smoothing capacitor C10 and a parasitic diode of switching element Q1. The partially smoothed DC output is converted into a high frequency output by means of an inverter circuit in the form of a half-bridge type including the switching elements Q1 and Q2. The high frequency output is fed through the leakage transformer LT1 to the discharge lamps La1 and La2 as a load for driving the same. Further, in this prior art, the harmonic distortion improving capacitor C4 compensates for a voltage difference between the rectifier DB and the valley-filling power source, while an input voltage is switched on and off by utilization of a high frequency voltage appearing within the inverter circuit so as to draw in the input current from the rectifier DB through a resonant circuit composed of leakage transformer LT1, capacitor C3, discharge lamps La1 and La2, and capacitor C7, and through capacitor C4 for improving harmonic distortion of the input current. The operation of this prior art is known and therefore not discussed herein.

When the above prior art sees that the discharge lamps La1 or La2 reaches to the lamp life end, a protective action is made as follows. That is, when the lamp reaches its lamp life end as a result of the depletion of the negative thermion radiating material (emitter) coated on the filaments, the lamp voltage of the discharge lamps La1 and La2 increases than in a normal condition. With this result, the voltage induced at the auxiliary winding N4 of the leakage transformer LT! increases so that the detection circuit 20 gives an abnormality detection signal to the control circuit CNT in response to the voltage induced at the auxiliary winding N4 exceeds a threshold. The control circuit CNT responds to the abnormality detection signal for activating the inverter circuit to intermittently oscillate, thereby effecting a protective action of reducing the stress on the circuit.

(Second Prior Art)

FIG. 2 shows a circuit diagram of another prior art which is identical in configuration to the circuit disclosed in FIG. 15 of a Japanese Patent Publication 2000-100587. The second prior art differs from the first prior art in that the inductor L2 forming the step-down chopper circuit is omitted, that diode 12 has its anode connected to a connection point of smoothing capacitor C10 and diode 13 and has its cathode connected to a connection point of the primary winding N1 of the leakage transformer LT1 and capacitor C3 in order to share the leakage transformer LT1 with the step-down chopper circuit, and that an output regulation circuit 21 is added in compensation for a large characteristic variation of a driving transformer T2. The output regulation circuit 21 includes a switching element Qb realized by a bipolar transistor connected across a control voltage source E through a variable resistor VR and a collector resistor Re. The switching element Qb has its base connected through a resistor Rd to a point between a resistor Rc and a capacitor Cb which are connected in series between the connection point of the switching elements Q1, Q2 and the negative pole of the control voltage source E. Connected between the output terminal of the control circuit CNT and the negative pole of the control voltage source E is a series combination of a diode Da, a resistor Ra, and a switching element Qa of bipolar transistor. The switching element Qa has its base connected through a base resistor Rb to a connection point of collector resistor Re and variable resistor VR. Further, a capacitor Ca and a diode Db are connected in parallel across the series combination of the switching element Qb and the collector resistor Re, while a diode Dc is connected in a base-emitter path of the switching element Qb. While the one switching element Q2 is off, capacitor Cb is charged through resistor Rc so that switching element Qb is caused to turn on in response to the voltage increase across capacitor Cb, thereby turning off the switching element Qa and giving no influence on the operation of the inverter circuit. When the switching element Q2 turns on, the switching element Qb is turned off so that the control voltage source E acts to charge capacitor Ca through variable resistor VR. As the voltage across capacitor Ca increases, the switching element Qa responds to turn on, thereby causing the switching element Q2 to turn off. Accordingly, it is made possible to regulate the on-period of switching element Q2 by varying the resistance of the variable resistor VR to thereby maintain the output substantially at a constant level irrespective of the varying characteristic of the driving transformer T2. Also this prior art has the same protective action as is made in the first prior art when the lamp life end is reached.

In the second prior art, however, the inclusion of the output regulation circuit 21 brings about an asymmetry (unbalance) of the on-period of the switching elements Q1 and Q2 in the normal lamp operating condition, whereby a DC voltage will be applied to capacitor C9 connected in series with the discharge lamps La1 and La2. With this result, the DC voltage of the charged capacitor C9 will be superimposed upon the high frequency output of the inverter circuit in the normal lamp operating, leading to a problem of causing a cataphoresis phenomenon particularly at a low temperature.

In order to solve the problem, it might be reasonable to remove capacitor C9 connected to the secondary of the leakage transformer LT1. However, this would causes another problem. That is, as the discharge lamp reaches the lamp life end, capacitor C9 accumulates an increased voltage so that the lamp voltage of the lamp of negative resistivity increases to make a great difference in the lamp voltage between the normal operating condition and the lamp life end condition. Such lamp voltage difference is utilized for detection of the lamp life end. However, in the absence of capacitor C9, the lamp voltage would make only a small difference between the normal operating condition and the lamp life end condition, making it difficult to detect the lamp life end particularly at a high temperature environment.

DISCLOSURE OF THE INVENTION

The present invention has been achieved in view of the above problem and has an object of providing a discharge lamp driving device which is capable of detecting the lamp life end reliably at either low or high temperature environment for circuit protection, yet preventing the cataphoresis phenomenon.

The discharge lamp driving device in accordance with the present invention includes a rectifier which rectifies an AC source voltage, a smoothing capacitor which smoothes out a pulsating output of the rectifier, an inverter circuit having one or more switching elements for conversion of the smoothed DC output made through the smoothing capacitor into a high frequency output, and a load circuit including a resonance circuit and a discharge lamp and being supplied with the high frequency output from the inverter circuit, an output transformer having a primary connected to an output end of the inverter circuit and having a secondary connected to one filament end of the discharge lamp, an impedance element inserted between the other filament end of the discharge lamp and a node having no high frequency amplitude, and an abnormality detection and protection means which detects an amplitude of the high frequency output flowing through the discharge lamp and the impedance element in order to make the circuit protection when the detected amplitude exceeds a predetermined threshold.

The abnormality detection and protection means judges the lamp life end of the discharge lamp when the amplitude of the high frequency output flowing through the discharge lamp and the impedance element exceeds the threshold. Since the impedance element is inserted between the other filament end of the discharge lamp and the node having no high frequency amplitude, reliable detection of the lamp life end can be made for the circuit protection at either low or high temperature environment. Further, since there is no need to connect a capacitor on the secondary of the output transformer, the cataphoresis phenomenon can be prevented.

In a preferred embodiment, the impedance element is inserted between the other filament end of the discharge lamp and a positive input terminal of the inverter circuit.

The impedance element may be inserted between the other filament end of the discharge lamp and a grounded input terminal or output terminal of the inverter circuit.

A plurality of the discharge lamps can be connected in series on the secondary side of the output transformer.

Each impedance element inserted between the filament of each of the individual discharge lamp and the node having no high frequency amplitude is preferred to have substantially the same impedance value.

In case where the plural discharge lamps are connected in series on the secondary side of the output transformer, the impedance element is inserted between the other filament end of at least one discharge lamp and the positive input terminal of the inverter circuit, while another impedance element is inserted between the other filament end of at least another discharge lamp and the grounded input terminal or output terminal of the inverter circuit.

In case where the plural discharge lamps are connected in series on the secondary side of the output transformer, the abnormality detection and protection means is set to make the circuit protective action when the amplitude of the high frequency output flowing through anyone of the discharge lamps and the impedance element exceeds a predetermined threshold.

Also in case where the plural discharge lamps are connected in series on the secondary side of the output transformer, the abnormality detection and protection means may be configured to detect the amplitude of a potential at a connection point of the filaments of the plural discharge lamps and also detect the amplitude of the high frequency output flowing through at least one discharge lamp and the impedance element such that it can make the circuit protective action when either or both of the amplitudes exceeds a predetermined threshold.

Further, in case where the plural discharge lamps are connected in series on the secondary side of the output transformer, the abnormality detection and protection means is configured to detect the amplitude of a potential at a connection point of the filaments of the plural discharge lamps such that it makes the circuit protective action when either of thus detected amplitude or the amplitude of the high frequency output flowing through at least one of the high-voltage and low-voltage side discharge lamps and the impedance element exceeds a predetermined threshold.

The impedance element may include a resistor, capacitor, and a series combination of a resistor and a capacitor.

When the inverter circuit is of a self-excited type, at least a portion of a driving circuit for driving the inverter circuit can be shared with components of the abnormality detection and protection means, enabling to reduce the number of the circuit components.

Still further, the impedance element can be shared with the resonance circuit included in the load circuit for reducing the number of the circuit components.

BEST MODES FOR CARRYING OUT THE INVENTION (First Embodiment)

Figure 3:
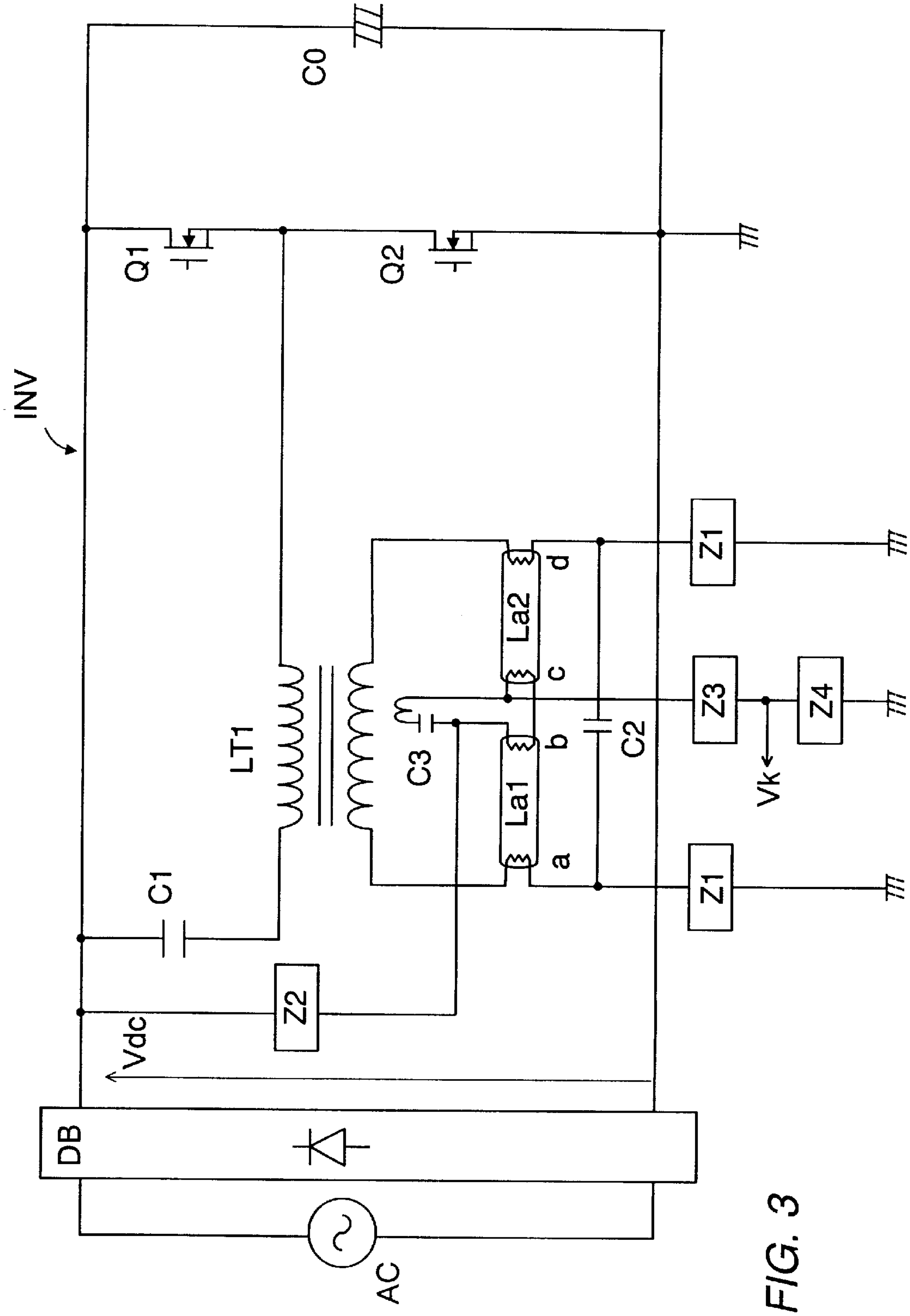
FIG. 3 is a schematic circuit diagram showing a discharge lamp driving device in accordance with a first embodiment of the present invention.

FIG. 3 shows a schematic circuit diagram of the discharge lamp driving device in accordance with the present embodiment. A series connected pair of switching elements Q1 and Q2 and a smoothing capacitor C0 are connected in parallel across pulsating output terminals of a rectifier DB that is composed of a diode bridge to rectify an AC source voltage AC. A leakage transformer LT1 has a primary winding N1 which is connected between the high-side output terminal of the rectifier DB and a connection point of the switching elements Q1 and Q2, and has a secondary winding N2 connected to filaments (a) and (d) of discharge lamps La1 and La2 of the same rating. For supplying a pre-heating current, the leakage transformer LT1 has an auxiliary winding N3 which is connected through a DC blocking capacitor C3 to the other filaments (b) and (c) of the discharge lamps La1 and La2. A capacitor C2 is connected to the ends of the filaments (a) and (d) away from the voltage source such that a resonant load circuit is constituted by the leakage transformer LT1, capacitor C2 and the discharge lamps La1 and La2.

In the present embodiment, the switching elements Q1 and Q2 is cooperative with the resonant load circuit to realize an inverter circuit INV of a half-bridge type which receives, as an input voltage, the DC voltage smoothed by the smoothing capacitor C0. The half-bridge type inverter circuit INV is known and is driven by a driver circuit (not shown but including a self-excited type using a driving transformer) to turn on and off the switching elements Q1 and Q2 alternately at a high frequency, applying a square wave high frequency voltage to the resonant load circuit so as to make the use of the resonance by a leakage inductance of the leakage transformer LT1 and the resonant-inducing capacitor C2 of the resonant load circuit to supply a high frequency voltage of substantially the sinusoidal waveform for operating the discharge lamps La1 and La2.

Next, the characterizing features of the present embodiment will be explained. Impedance elements Z1, Z1 are inserted respectively between the filament (a) of the discharge lamp La1 and a node (ground) having no high frequency amplitude and between the filament (d) of the discharge lamp La2 and the node, while an impedance element Z2 is inserted between the filament (b) and the capacitor C3 that is connected between the high-side terminal of the rectifier DB and the auxiliary winding N3 of the leakage transformer LT1. Further, a series circuit of impedance elements Z3 and Z4 is connected between the ground and a connection point of the auxiliary winding N3 and the filament (c).

Figure 4:
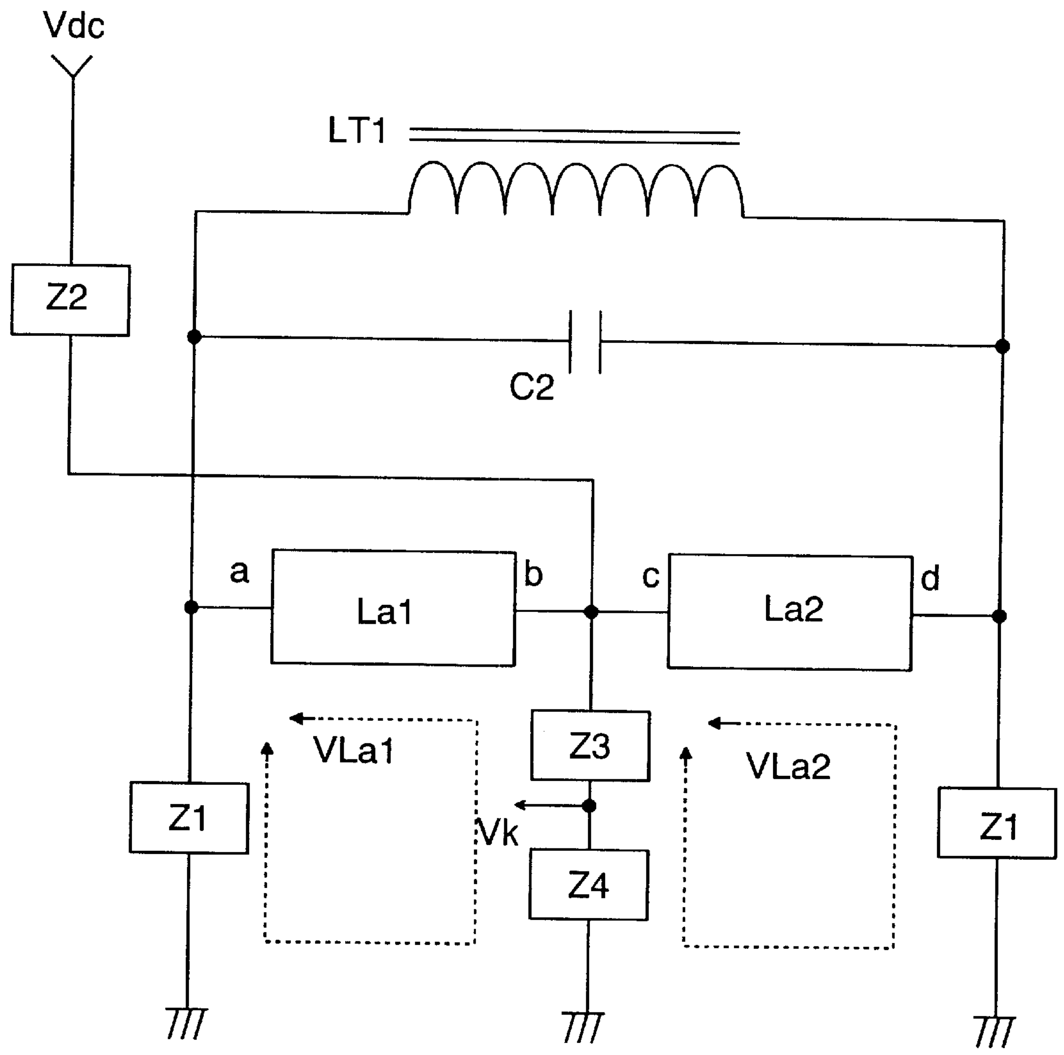
FIG. 4 is a circuit diagram of a principal portion of the above device.

FIG. 4 is a circuit diagram showing the resonant load circuit extracted as a principal portion. The lamp voltages VLa1 and VLa2 supplied to the two discharge lamps La1 and La2 are each applied to each closed loop composed of the impedance elements Z1, Z3, and Z4. Also, the pulsating output Vdc from the rectifier DB divided by the impedance element Z2 is applied as a DC voltage to the series circuit of the impedance elements Z3 and Z4. A detected voltage Vk derived from the connection point of the impedance elements Z3 and Z4 is a voltage corresponding to a combination of an AC component which is a difference between the lamp voltages VLa1 and VLa2 of the two discharge lamps La1 and La2 respectively divided by the impedance elements Z1, Z3 and Z4, and a DC component which is the pulsating output Vdc from the rectifier DB divided by the impedance elements Z2, Z3, and Z4.

Figure 5A:
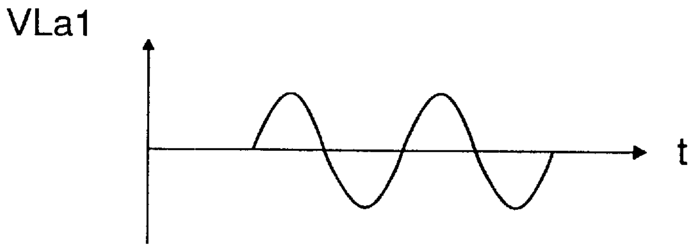
FIGS. 5A–5F are waveform charts for explaining the circuit operation at a normal condition.
Figure 5B:
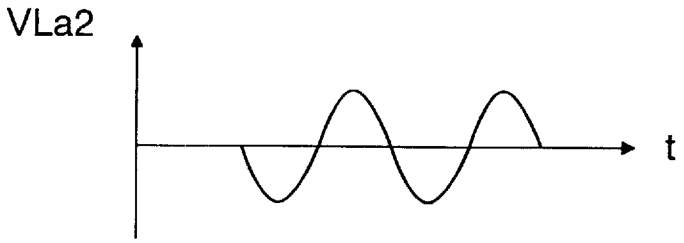
Figure 5C:
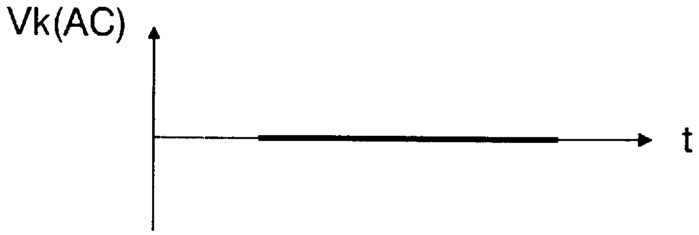
Figure 5D:
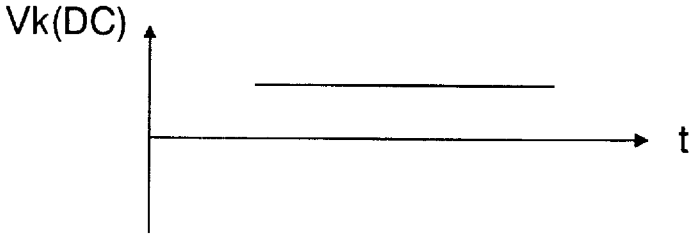
Figure 5E:
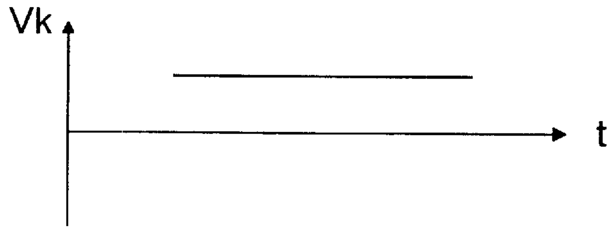
Figure 5F:
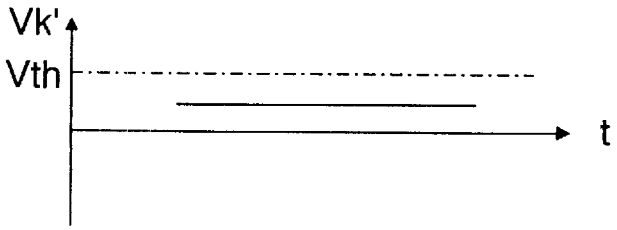

When both of the two discharge lamps La1 and La2 are normal, the lamp voltages VLa1 and VLa2 of the lamps La1 and La2 are sinusoidal of the same amplitude but in out of phase relation to each other by about one-half cycle, as shown in FIGS. 5A and 5B, such that the lamp voltages are cancelled at the connection point of the impedance elements Z3 and Z4, causing the detected voltage Vk to have substantially zero AC component Vk(AC), as shown in FIG. 5C. In this condition, since the connection point of the Impedance elements Z3 and Z4 sees the DC component Vk(DC) depending upon the dividing ratio of the impendance elements Z2 to Z4, as seen in FIG. 5, the detected voltage Vk is eventually equal to the DC component Vk(DC).

Figure 6A:
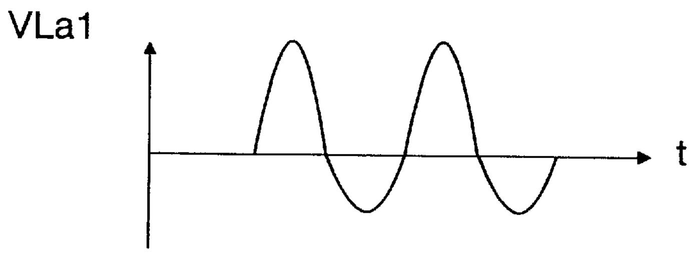
FIGS. 6A–6F are waveform charts for explaining the circuit operation at an emitter depletion condition.
Figure 6B:
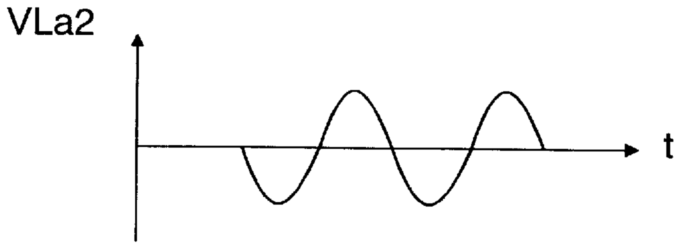
Figure 6C:
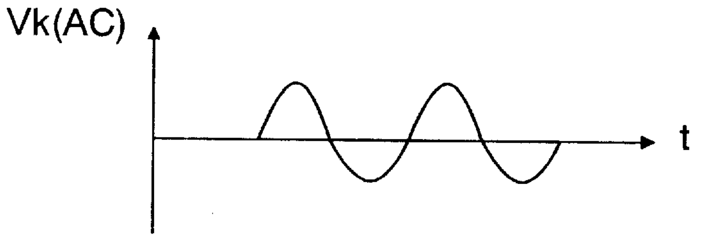
Figure 6D:
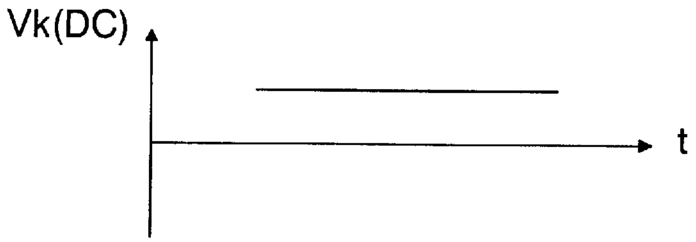
Figure 6E:
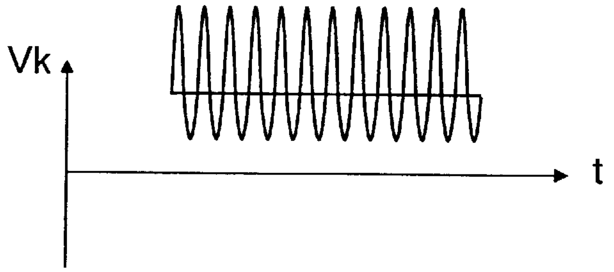
Figure 6F:
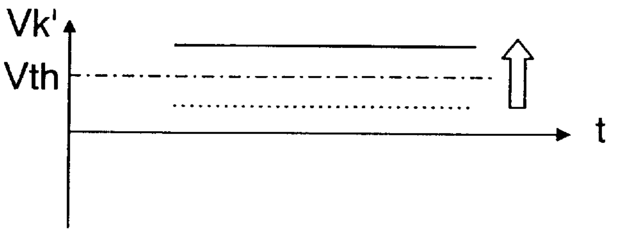

When, on the other hand, the filament of the discharge lamp La1 becomes depleted (emitter depletion condition), for example, the filament radiates only a reduced amount of thermion, whereby the lamp voltage VLa1 of the discharge lamp La1 be comes asymmetric with respect to the zero voltage with a larger amplitude than in the normal condition. With this result, no cancellation of the voltages is made at the connection point of the impedance elements Z3 and Z4, whereby an oscillation voltage appears as the AC component Vk(AC) of the detected voltage Vk, as shown in FIG. 6C. It is noted that the DC component Vk(DC) is kept unvaried, as shown in FIG. 6D. That is, the detected voltage Vk will be the voltage corresponding to the high frequency AC component Vk(AC) superimposed on the DC component Vk(DC), as shown in FIG. 6E. Therefore, the detected voltage Vk, which is the high frequency AC component Vk(AC) superimposed on the DC component Vk(DC), can be processed such as by a peak detection in order to obtain a purely DC detected voltage Vk', as shown in FIG. 6F, depending on the lamp voltage VLa1 of the discharge lamp La1 suffering from the depletion of the emitter. Thus obtained detected voltage Vk' is compared with a predetermined threshold Vth such that the discharge lamp can be judged to reach the lamp life end when the detected voltage Vk' exceeds the threshold Vth. This judgment is made at an abnormality detection circuit (not shown) which transmits an abnormality detection signal to a control circuit (not shown) when the abnormality (the lamp life end due to the emitter depletion condition) is detected. In response to the abnormality signal, the control circuit responds to control the switching elements Q1 and Q2 in such a manner as to intermittently oscillate the inverter circuit for making the circuit protection.

The present embodiment is contemplated to insert the impedance elements Z1, Z1 respectively between the one filament of the discharge lamp La1 and the node having no high frequency amplitude (the ground) and between the one filament of the discharge lamp La2 and the node, and to detect the AC component difference between the lamp voltages VLa1 and VLa2 of the discharge lamps La1 and La2 in the respective closed loops each including the impedance element Z1 and each of the discharge lamps La1 and La2 in order to judge whether or not there is the abnormality due to the depletion of the emitter. Therefore, it is made possible to detect the occurrence of the abnormality reliably irrespective of the fact that the discharge lamps La1 and La2 give the lamp voltages VLa1 and VLa2 of varying amplitudes depending on the temperature, i.e., irrespective of the low and high temperature environments. Also, since there is no need to include a DC blocking capacitor on the side of the secondary winding N2 of the leakage transformer LT1, no DC component is applied to the discharge lamps La1 and La2 so as to prevent the cataphoresis phenomenon. Further, since the present embodiment is configured such that the pulsating output Vdc of the rectifier DB has an effect on the detected voltage Vk', it is possible to reliably detect the occurrence of the abnormality even with the use of the inverter circuit of which output varies with the varying AC source voltage, that is, increases with the raised AC source voltage and decreases with the lowered AC source voltage.

(Second Embodiment)

Figure 7:
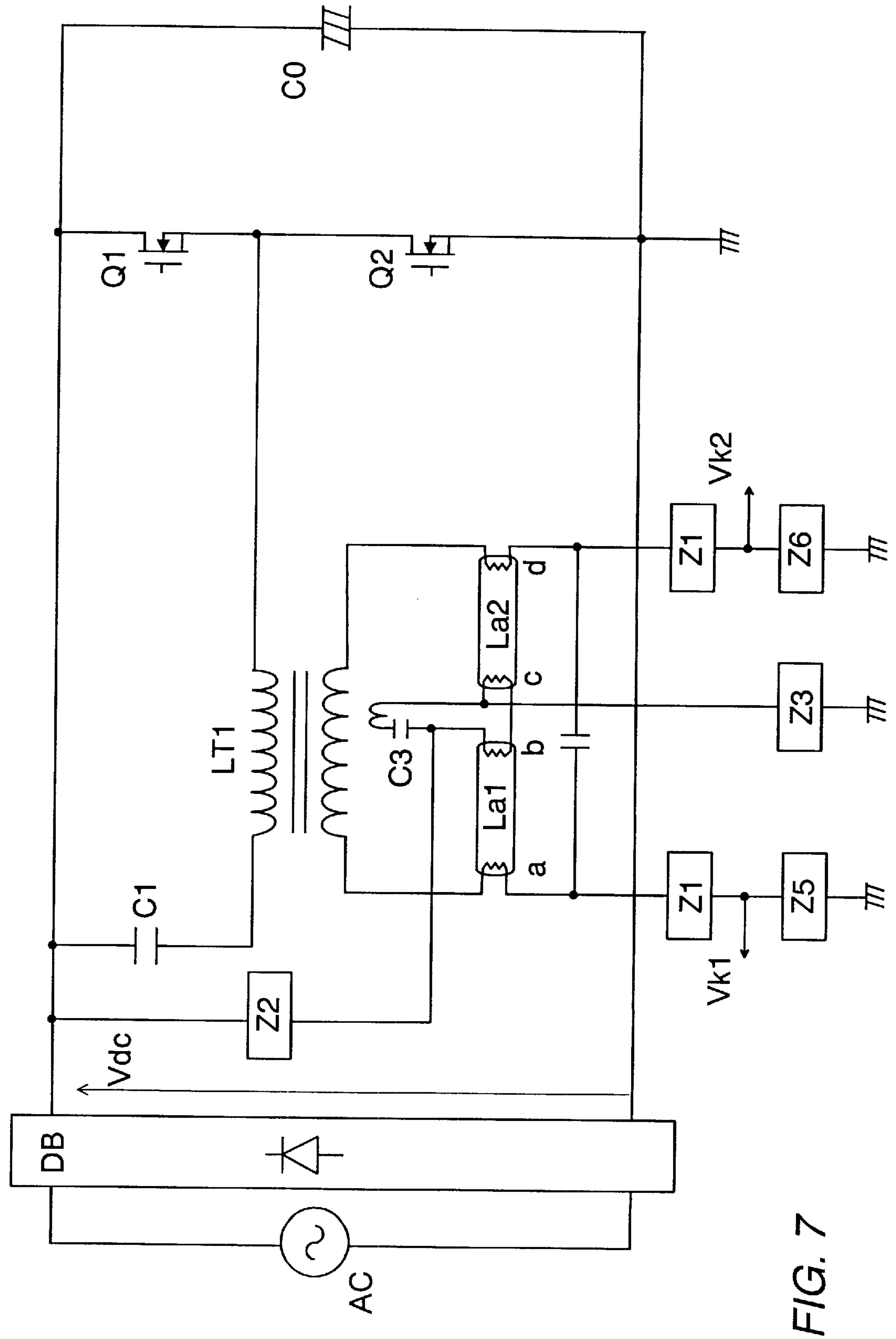
FIG. 7 is a schematic circuit diagram showing a discharge lamp driving device in accordance with a second embodiment of the present invention.
Figure 8:
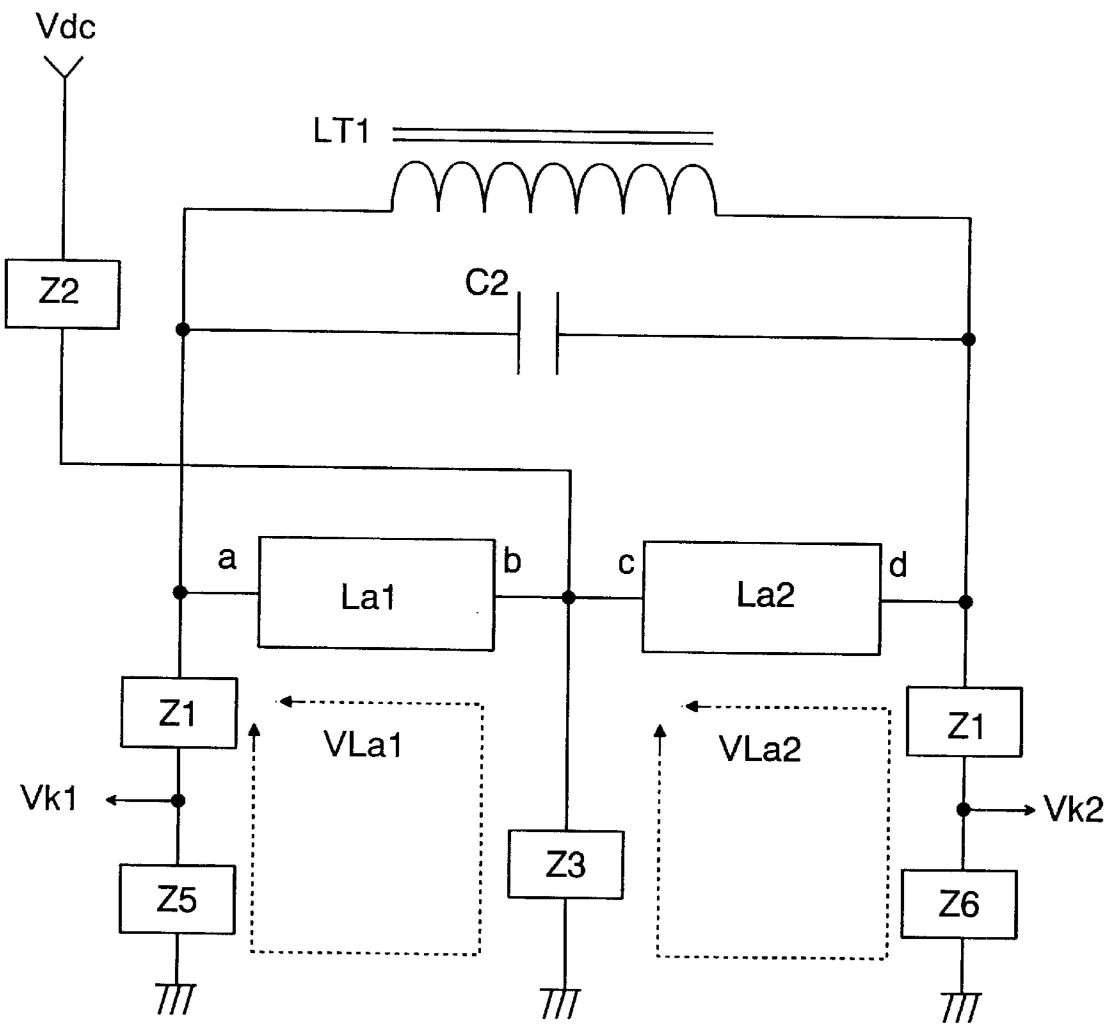
FIG. 8 is a circuit diagram of a principal portion of the above device.

FIG. 7 shows a schematic circuit diagram of the discharge lamp driving device in accordance with the present embodiment, while FIG. 8 shows a circuit diagram about a principal portion of the above. A basic configuration of the present embodiment is identical to the first embodiment and therefore no duplicate explanation is made herein. The like parts are designated by the like reference numerals. Here, only the characterizing features of the present embodiment will be now explained.

The present embodiment is contemplated to insert series combinations of impedance elements Z1 and Z5 respectively between the filament (a) of the discharge lamp La1 and the ground, and between the filament (d) of the discharge lamp La2, and also insert a impedance element Z3 alone between the filament (c) of the discharge lamp La2 and the ground. The like abnormality detection circuit (not shown) is included to judge the presence of the abnormality with regard to the one discharge lamp La1 based upon the detected voltage Vk1 derived from the connection point of the impedance elements Z1 and Z5, and to judge the presence of the abnormality with regard to the other discharge lamp La2 based upon the detected voltage Vk2 derived from the connection point of the impedance elements Z1 and Z6. When the abnormality is judged fro anyone of the discharge lamps La1 and La2, the like control circuit (now shown) operates to give the protective action such as by making the intermittent oscillation.

In the present embodiment, the detected voltage Vk1 reflecting the lamp voltage VLa1 of the discharge lamp La1 is used to detect the abnormality (depletion of the emitter), and the detected voltage Vk2 reflecting the lamp voltage VLa2 of the discharge lamp La2 is used to detect the abnormality (depletion of the emitter). Also in the present embodiment, it is equally possible to reliably judge the abnormality irrespective of the varying amplitudes of the lamp voltage VLa1 and VLa2 from low to high temperature environments as is made in the first embodiment. Also, since the detected voltages Vk1 and Vk2 are made reflective of the DC component of the pulsating output Vdc from the rectifier DB as is made in the first embodiment, it is possible to reliably detect the occurrence of the abnormality even with the use of the inverter circuit of which output varies with the varying AC source voltage, that is, increases with the raised AC source voltage and decreases with the lowered AC source voltage.

(Third Embodiment)

Figure 9:
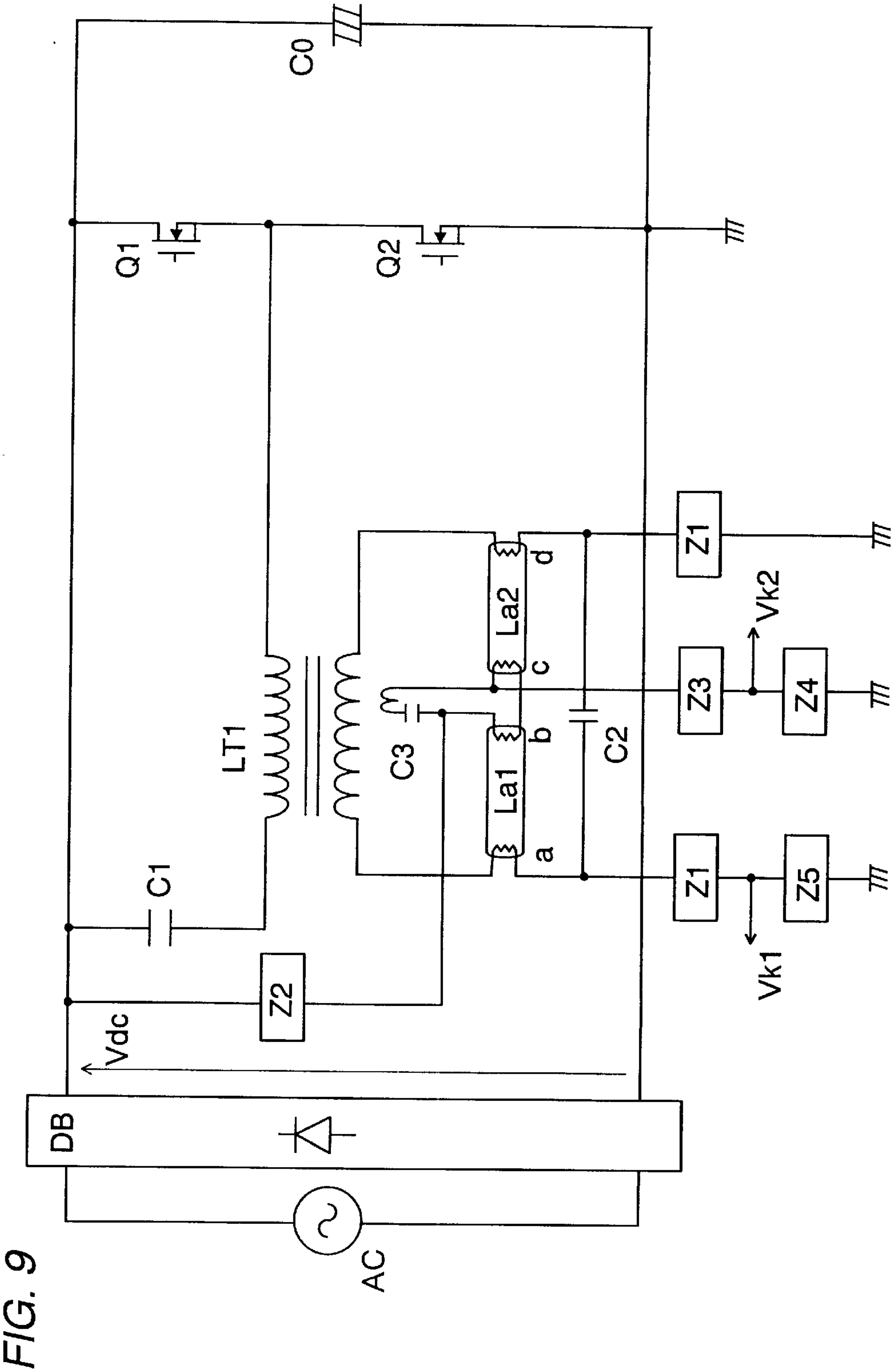
FIG. 9 is a schematic circuit diagram showing a discharge lamp driving device in accordance with a third embodiment of the present invention.
Figure 10:
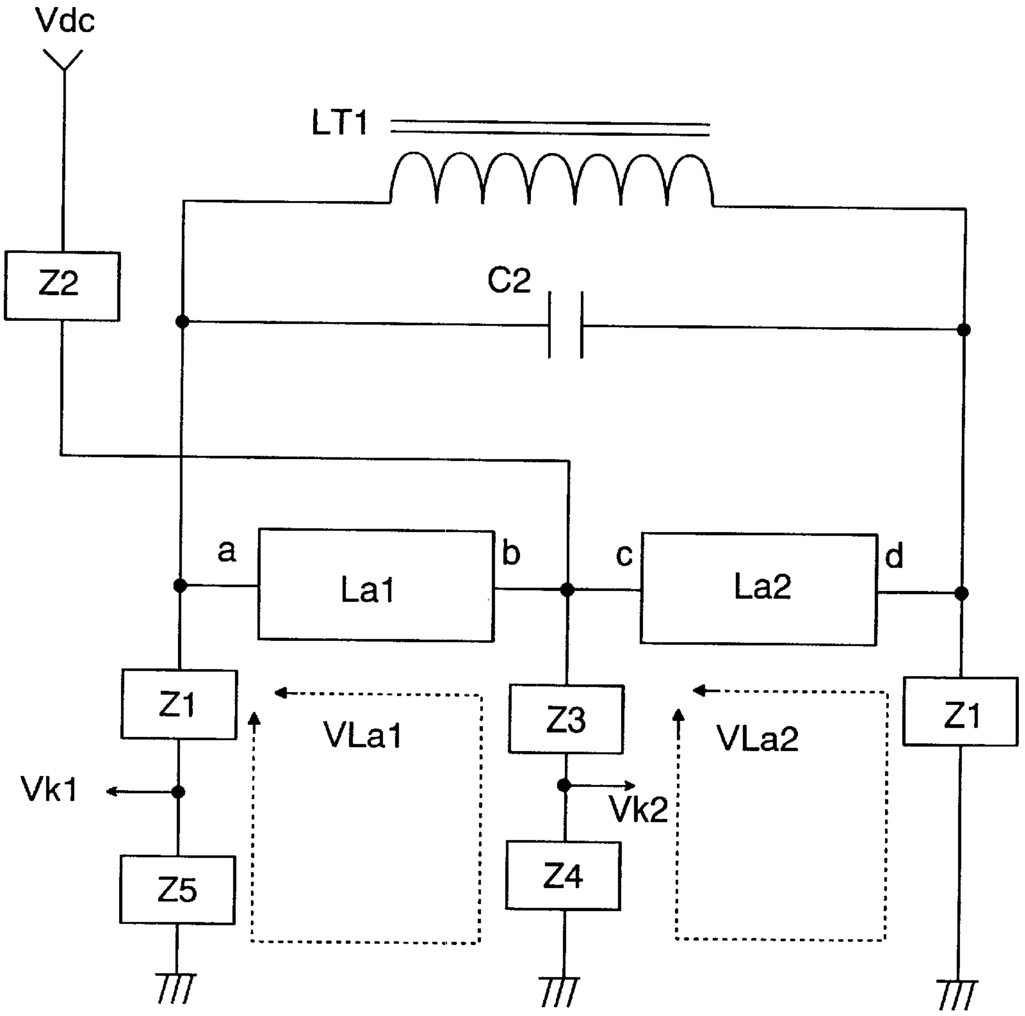
FIG. 10 is a circuit diagram of a principal portion of the above device.

FIG. 9 shows a schematic circuit diagram of the discharge lamp driving device in accordance with the present embodiment, while FIG. 10 shows a circuit diagram about a principal portion of the above. A basic configuration of the present embodiment is identical to the first embodiment and therefore no duplicate explanation is made herein. The like parts are designated by the like reference numerals. Here, only the characterizing features of the present embodiment will be now explained.

The present embodiment is characterized to insert a series combination of impedance elements Z1 and Z5 between the filament (a) of the discharge lamp La1 and the ground in order to obtain a detected voltage Vk1 derived from the connection point between the impedance elements Z1 and Z5, and to obtain a detected voltage Vk2 derived from the connection point between impedance elements Z3 and Z4 such that the like abnormality detection circuit (not shown) can judge the occurrence of the abnormality for the discharge lamps La1 and La2 based upon the detected voltages Vk1 and Vk2. When the abnormality is judged to occur in the discharge lamps La1 and La2, the like control circuit (not shown) operates to give the protective action such as by making the intermittent oscillation. In the first embodiment, either when there occurs the depletion of the emitter in the filament (a) of the discharge lamp La1 connected to the secondary winding N2 and also in the filament (c) of the discharge lamp La2 connected to the auxiliary winding, or when there occurs the depletion of the emitter in the filament (b) of the discharge lamp La1 connected to the auxiliary winding N3 and also in the filament (d) of the discharge lamp La2 connected to the secondary winding N2, the detected voltage Vk has only a small AC component Vk(DC) which makes it difficult to judge the presence of the abnormality.

However, in the present embodiment, the detected voltage Vk2 derived from the connection point of the impedance elements Z3 and Z4 is relied upon to judge whether anyone of the discharge lamps La1 and La2 reaches the lamp life end due to the depletion of the emitter, while the detected voltage Vk1, which is derived from the connection point of the impedance elements Z1 and Z5 as corresponding to the lamp voltage VLa1 of the discharge lamp La1, is relied upon to judge whether both of the discharge lamps La1 and La2 reach the lamp life end due to the depletion of the emitter. That is, the lamp life end can be judged even in a condition which satisfies both of the events, one in which the depletion of the emitter occurs in the filament (a) of the discharge lamp La1 connected to the secondary winding N2 or in the filament (c) of the discharge lamp La2 connected to the auxiliary winding, and the other in which the depletion of the emitter occurs in the filament (b) of the discharge lamp La1 connected to the auxiliary winding N3, or in the filament (d) of the discharge lamp La2 connected to the secondary winding N2.

(Fourth Embodiment)

Figure 11:
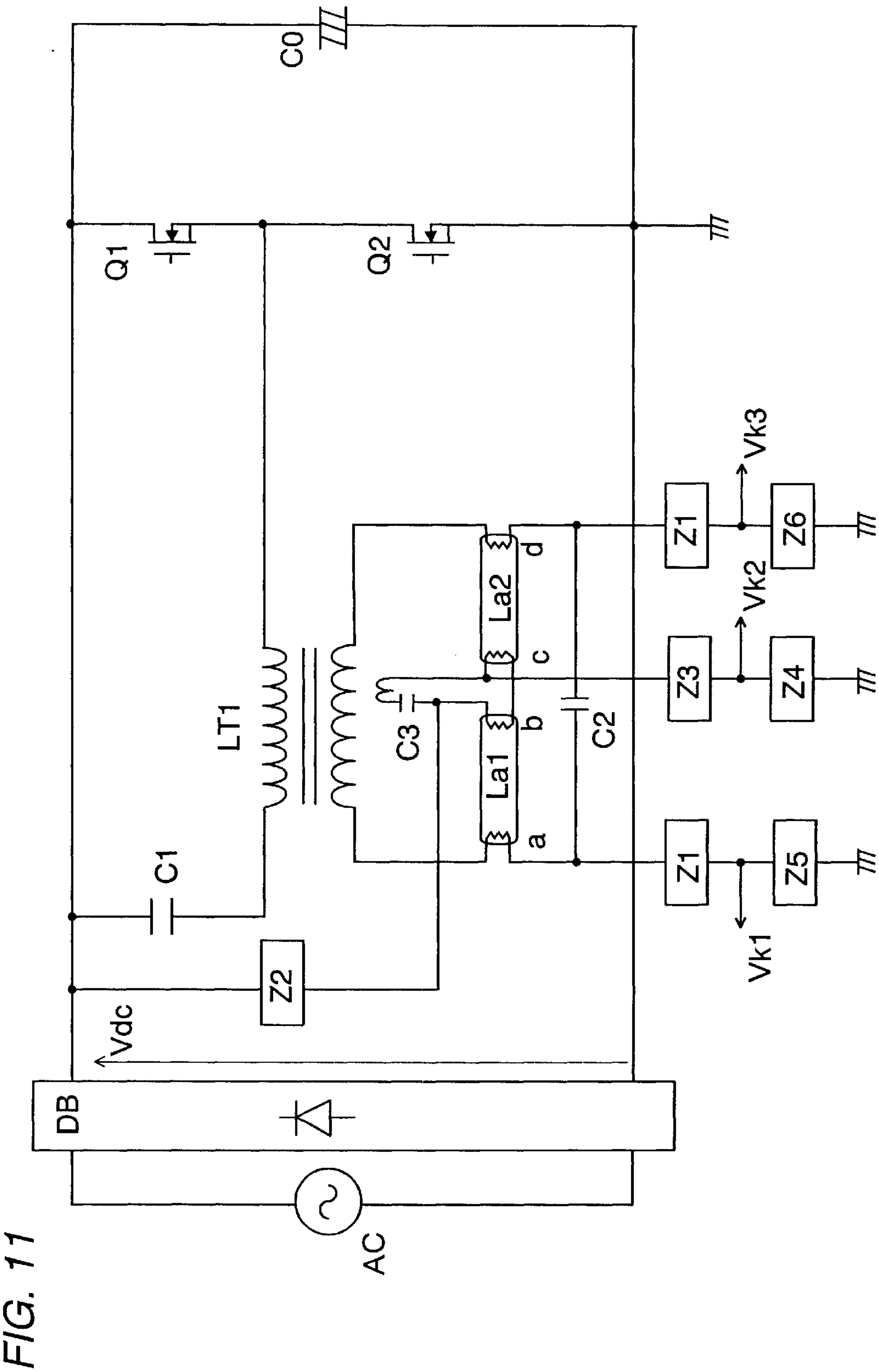
FIG. 11 is a schematic circuit diagram showing a discharge lamp driving device in accordance with a fourth embodiment of the present invention.
Figure 12:
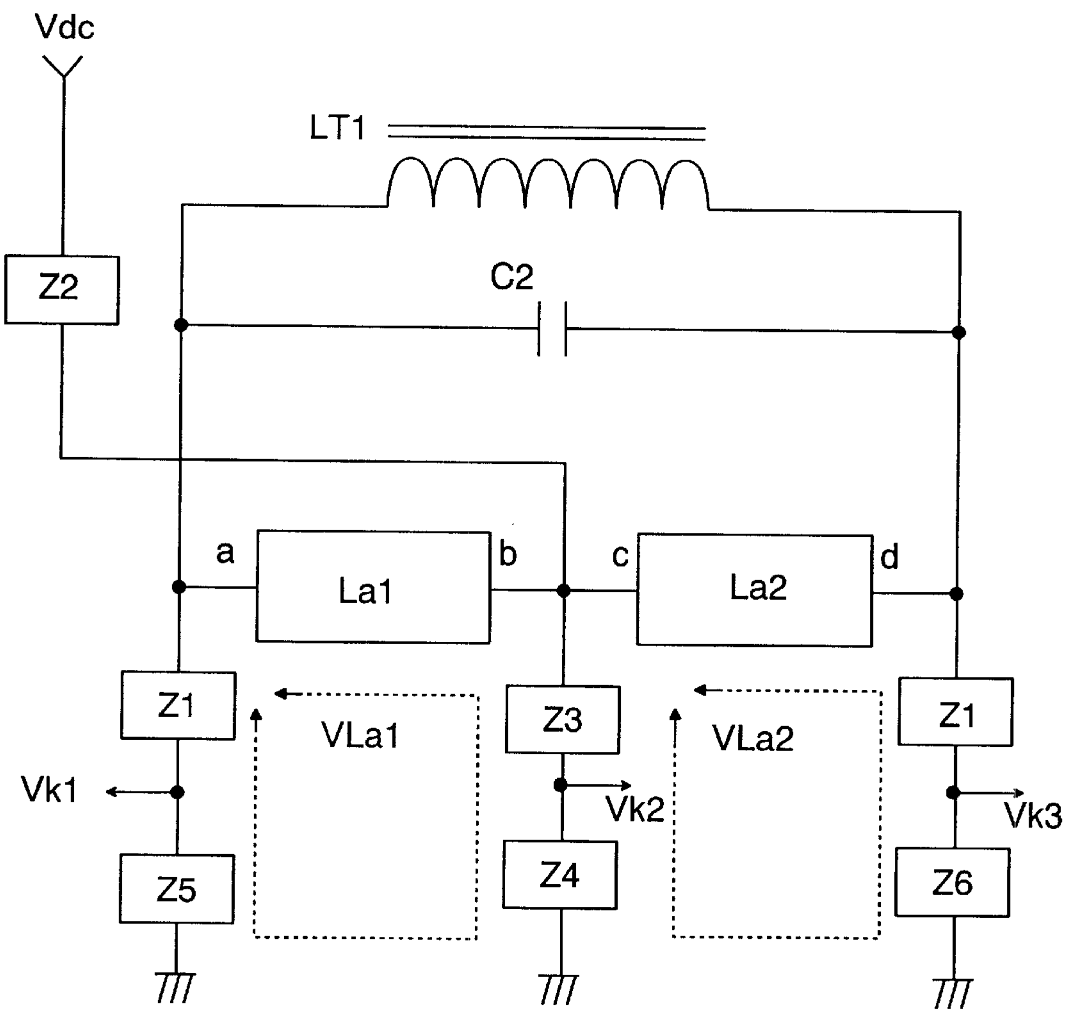
FIG. 12 is a circuit diagram of a principal portion of the above device.

FIG. 11 shows a schematic circuit diagram of the discharge lamp driving device in accordance with the present embodiment, while FIG. 12 shows a circuit diagram about a principal portion of the above. A basic configuration of the present embodiment is identical to the first embodiment and therefore no duplicate explanation is made herein. The like parts are designated by the like reference numerals. Here, only the characterizing features of the present embodiment will be now explained.

The present embodiment, which combines the features of the first embodiment and the second embodiment, is characterized to insert a series circuit of impedance elements Z1 and Z5 between the filament (a) of the discharge lamp La1 and the ground, and another series circuit of impedance elements Z1 and Z6 between the filament (d) of the discharge lamp La2 and the ground, and to utilize the like abnormality detection circuit (not shown) which judges the abnormality in either or both of the discharge lamps La1 and La2 based upon a detected voltage Vk1 derived from the point to the impedance elements Z2 and Z5 as corresponding the lamp voltage VLa1 of the discharge lamp La1, upon a detected voltage Vk2 derived from the connection point of the impedance elements Z3 and Z4, and upon a detected voltage Vk3 derived from the connection point of the impedance elements Z1 and Z6 as corresponding to the lamp voltage VLa2 of the discharge lamp La2.

With the present embodiment, it is possible to judge the abnormality in all events including the depletion of the emitter in anyone of the discharge lamps but also in both of the discharge lamps La1 and La2.

(Fifth Embodiment)

Figure 13:
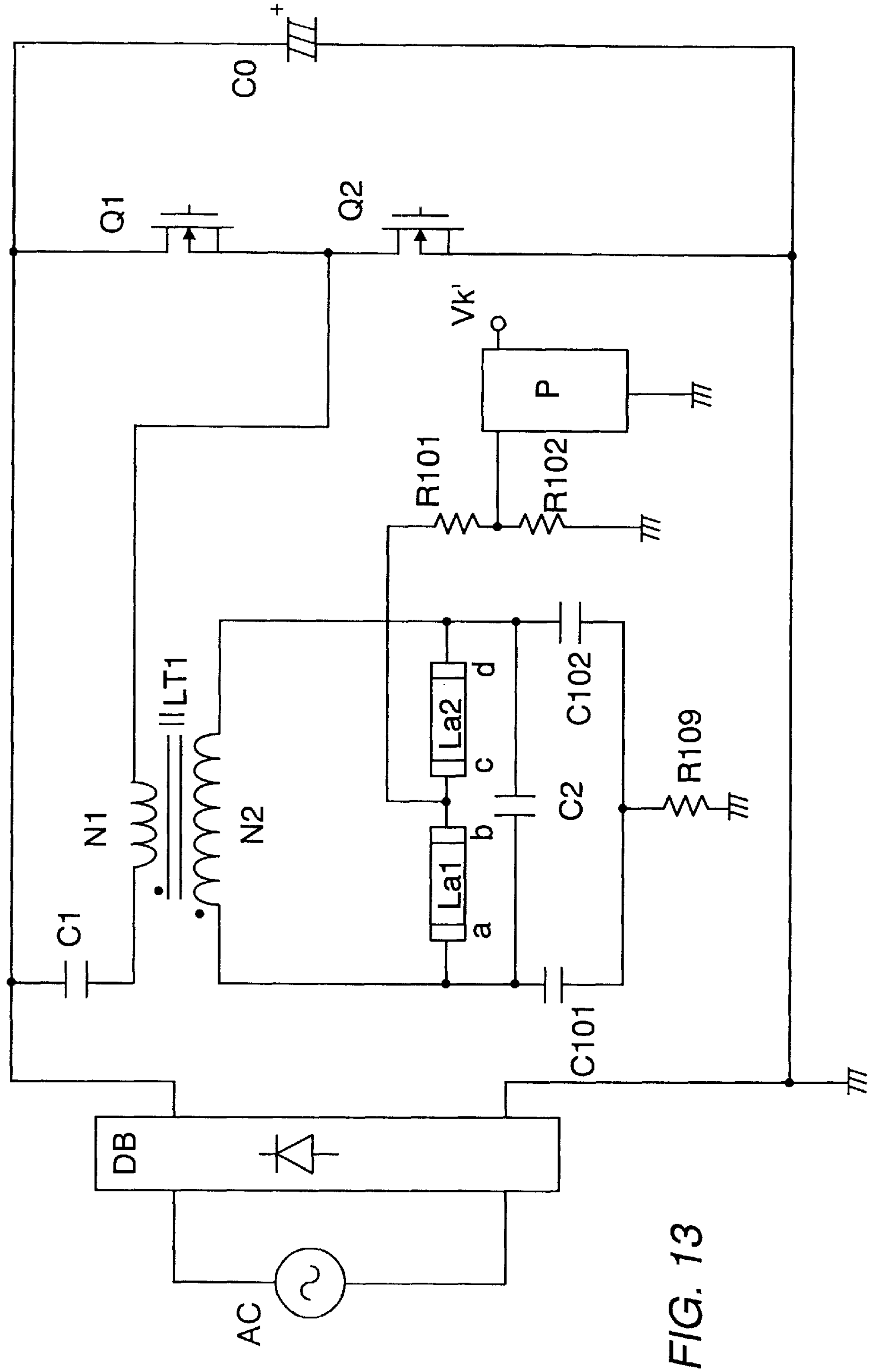
FIG. 13 is a schematic circuit diagram showing a discharge lamp driving device in accordance with a fifth embodiment of the present invention.
Figure 14:
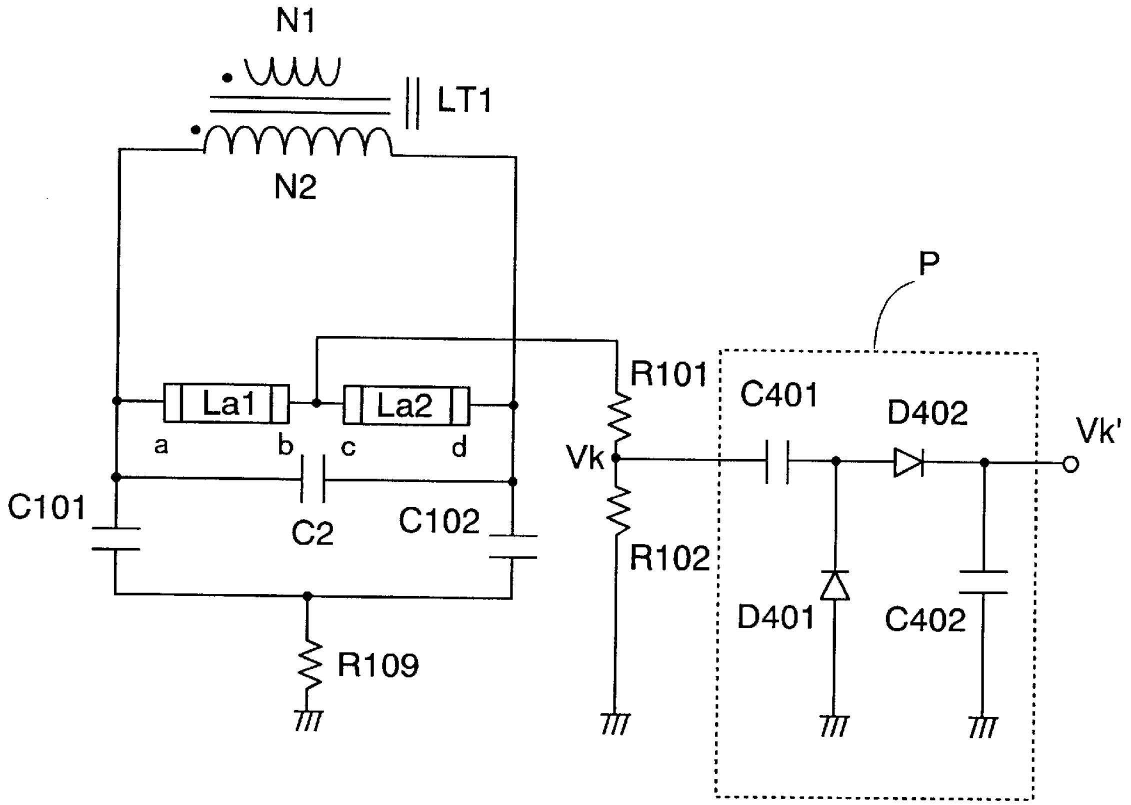
FIG. 14 is a circuit diagram of a principal portion of the above device.

FIG. 13 shows a schematic circuit diagram of the discharge lamp driving device in accordance with the present embodiment, while FIG. 14 shows a circuit diagram about a principal portion of the above. A basic configuration of the present embodiment is identical to the first embodiment and therefore no duplicate explanation is made herein. The like parts are designated by the like reference numerals. Here, only the characterizing features of the present embodiment will be now explained.

The present embodiment utilizes capacitors C101 and C102 as the individual impedance elements Z1 and Z1, and a resistor 109 connected between the capacitors C101, C102 and the ground. The resistor 109 limits a high frequency signal flowing through capacitors C101 and C012 to the ground in the normal operating condition of the discharge lamps La1 and La2, reducing circuit noises. An inductor may be utilized instead of resistor 109.

Also, a peak detection circuit P is provided to convert the detected voltage Vk at the connection point of the impedance elements Z3 and Z4 respectively in the form of resistors R101 and R102 into a detected DC voltage Vk'. The peak detection circuit P includes a series circuit of a DC blocking capacitor C401 and a diode D402 connected to the point between the resistors R101 and R102, a diode D401 inserted between the ground and the connection point of capacitor C401 and diode D401, and a smoothing capacitor C402 connected between the cathode of diode D402 and the ground. Thus, the capacitor C401 DC cuts out the DC component Vk(DC) of the detected voltage Vk so as to charge C402 with energy corresponding to the peak value of the AC component Vk(AC) of the detected voltage Vk, thereby effectively obtaining the detected voltage Vk' having only the DC component corresponding to the difference in the lamp voltages VLa1 and VLa2 of the discharge lamps La1 and La2. As is explained with reference to the first embodiment, the detected voltage Vk' is compared with the predetermined threshold Vth such that the discharge lamps La1 and La2 can be judged to reach the lamp life end when the detected voltage exceeds the threshold Vth.

(Sixth Embodiment)

Figure 15:
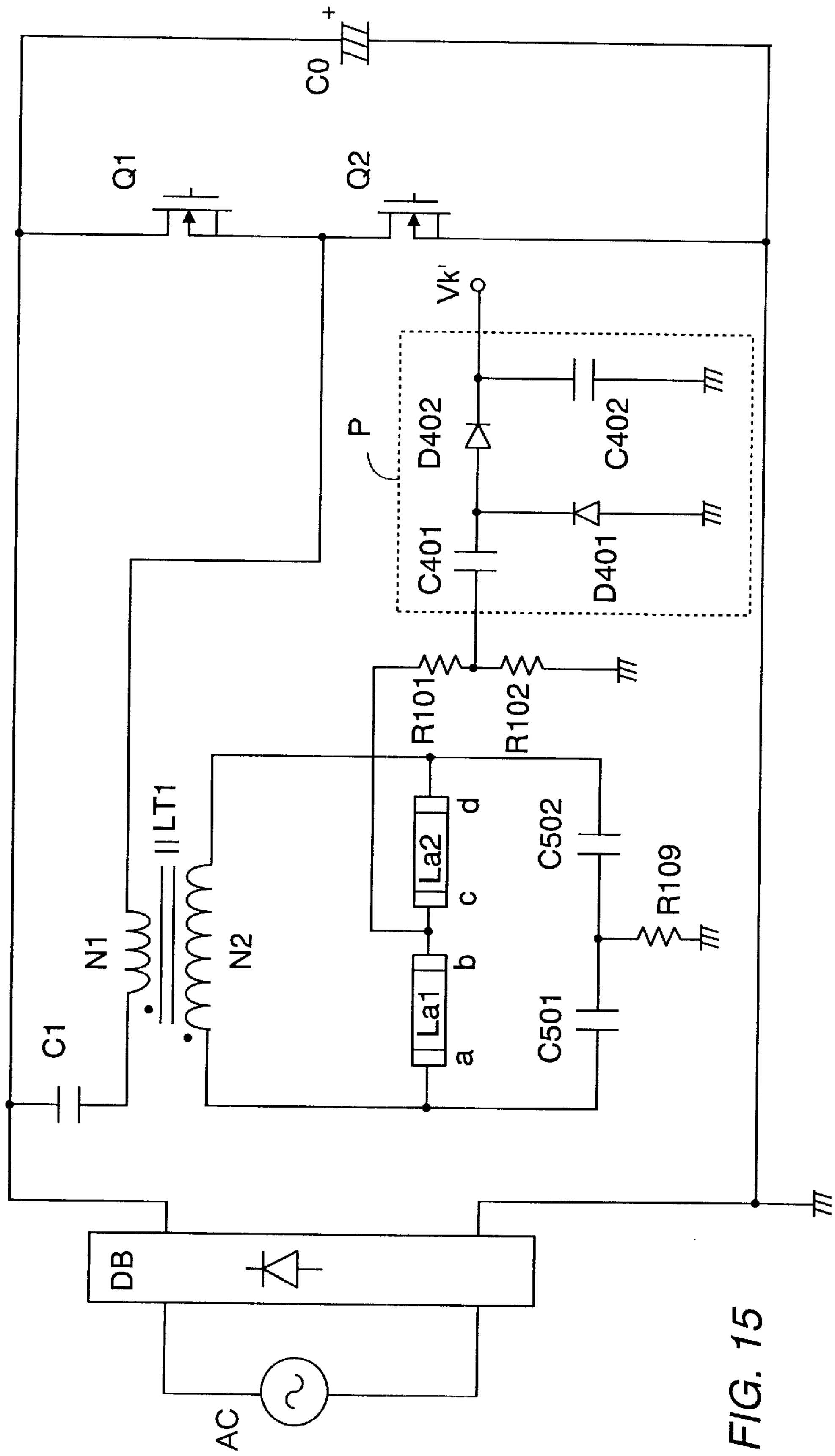
FIG. 15 is a partly omitted schematic circuit diagram showing a discharge lamp driving device in accordance with a sixth embodiment of the present invention.

FIG. 15 shows a schematic circuit diagram of the discharge lamp driving device in accordance with the present embodiment. A basic configuration of the present embodiment is identical to the fifth embodiment and therefore no duplicate explanation is made herein. The like parts are designated by the like reference numerals. Here, only the characterizing features of the present embodiment will be now explained.

The present embodiment is characterized in that capacitors C501 and C502 are utilized respectively as impedance elements Z1 and Z1, and also act as the resonant inducing capacitor C2 to dispense with capacitor C2. The circuit operation such as for detecting the depletion of the emitter is identical to the fifth embodiment and therefore its explanation is not made herein.

Thus, the present embodiment has an advantage of reducing the number of the components as the capacitors C501 and C502 are utilized as the impedance elements Z1 and also as the resonant inducing capacitor C2.

(Seventh Embodiment)

Figure 1:
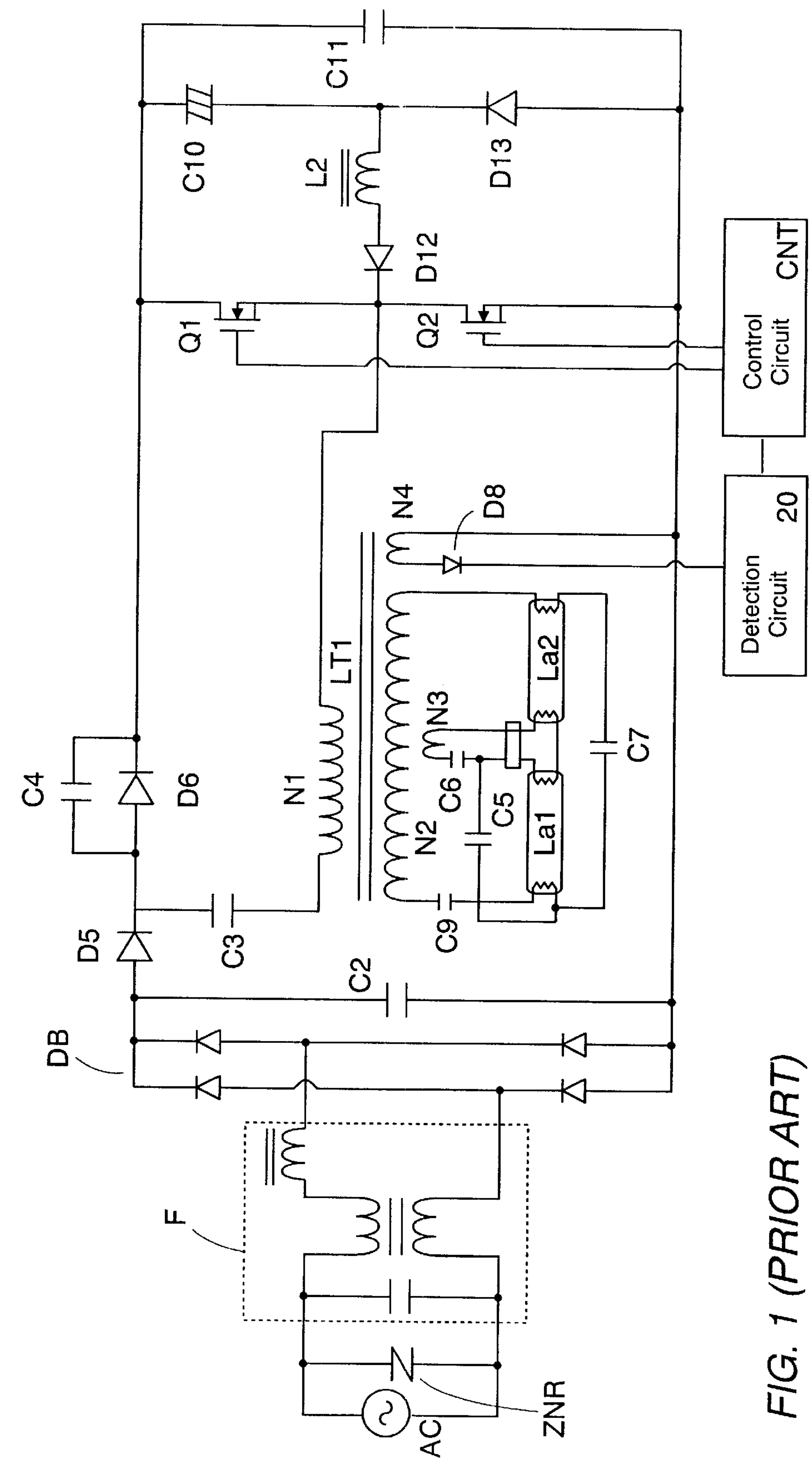
FIG. 1 (PRIOR ART)
FIG. 1 is a schematic circuit diagram showing the first prior art.
Figure 2:
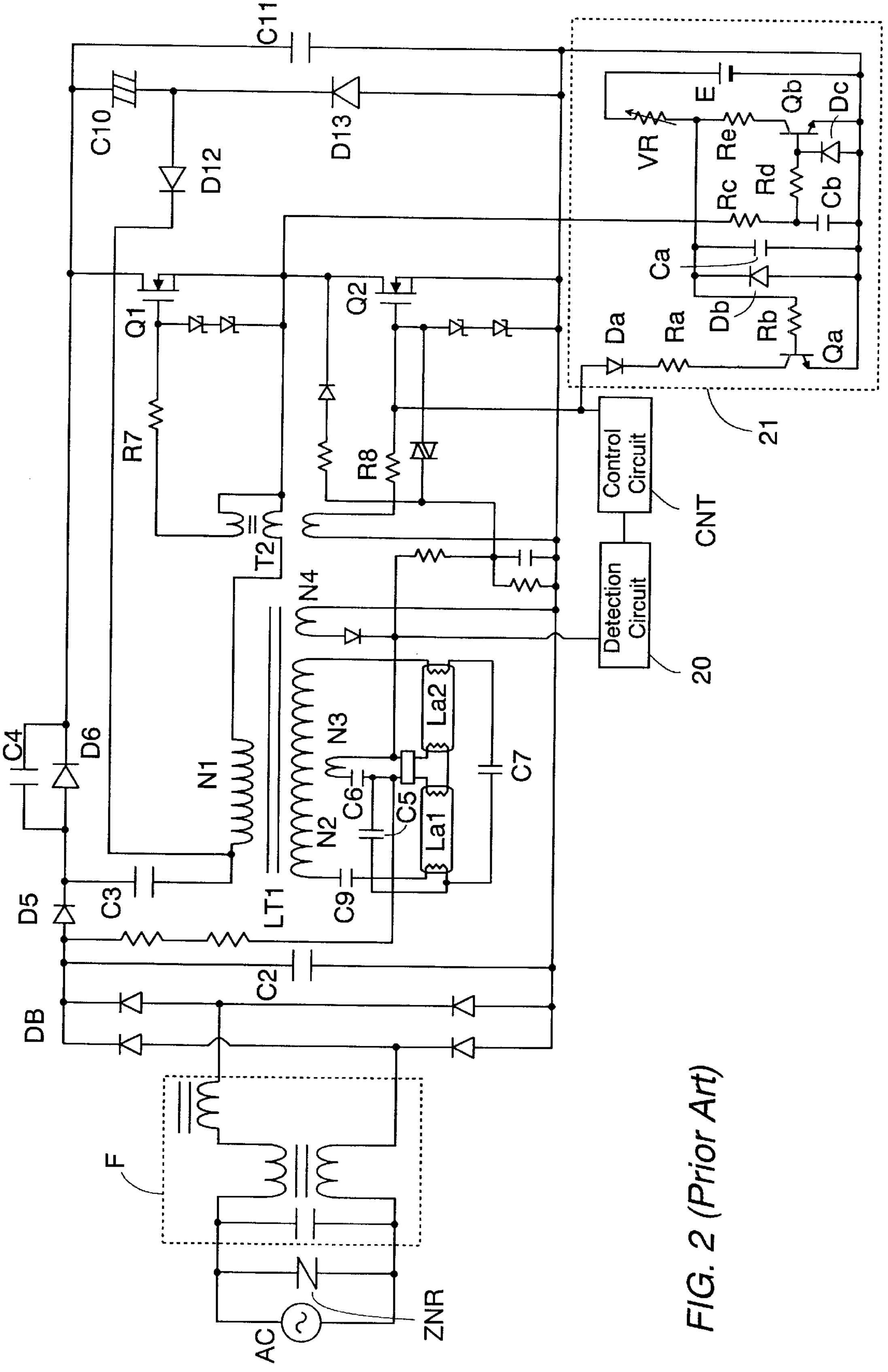
FIG. 2 (Prior Art)
FIG. 2 is a schematic circuit diagram showing the second prior art.
Figure 16:
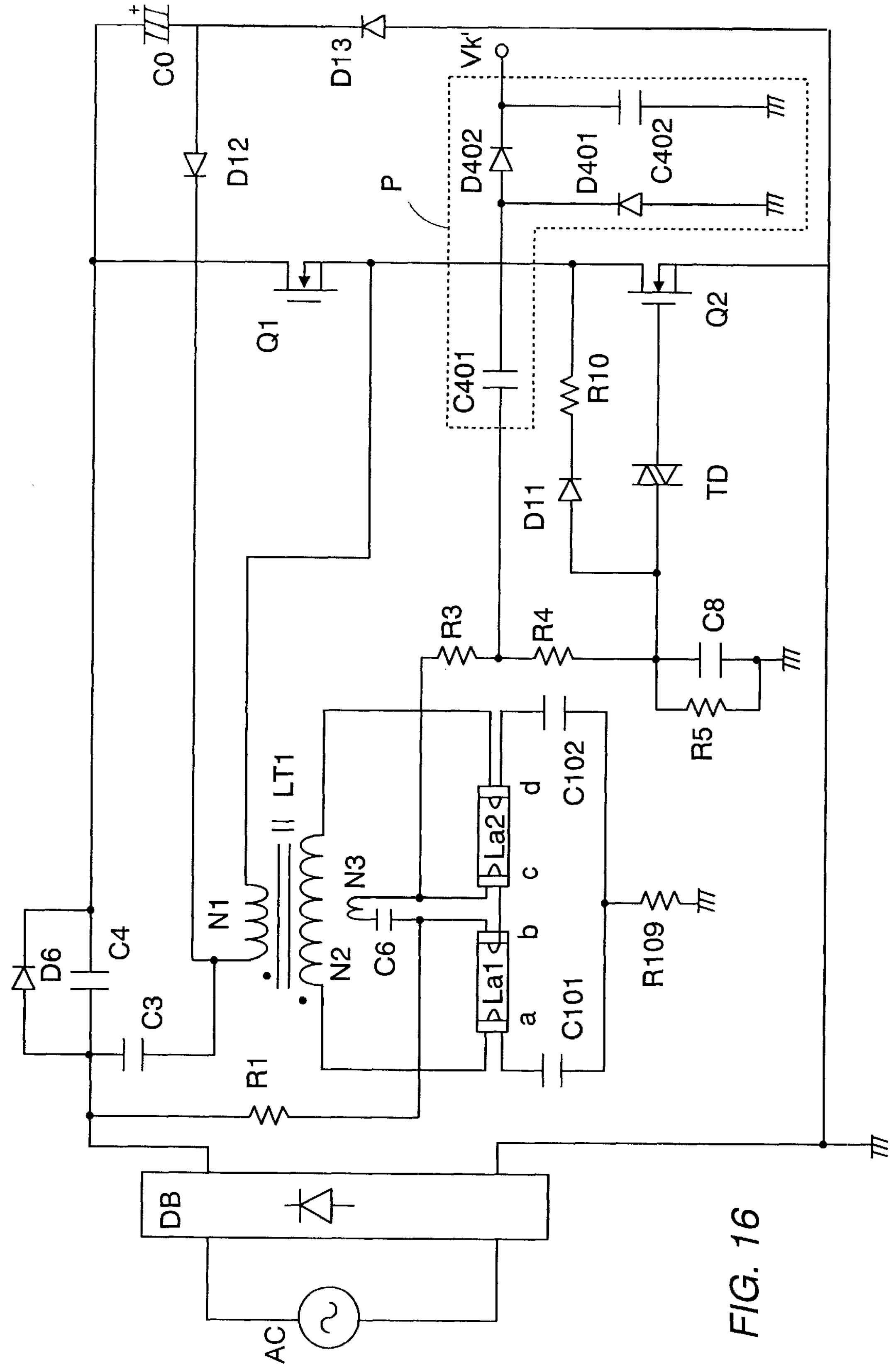
FIG. 16 is a partly omitted schematic circuit diagram showing a discharge lamp driving device in accordance with a seventh embodiment of the present invention.

FIG. 16 is a partially omitted schematic circuit diagram showing the present embodiment which is basically similar to the second prior art of FIG. 2. Therefore, like configuration common to the second prior art is not shown and no duplicate explanation is made herein. Like parts are designated by like reference numerals. Here, only the characterizing features of the present embodiment will be now explained.

As shown in FIG. 16, a resistor R1 is inserted between the high-side output terminal of the rectifier DB and a connection point of capacitor C6 connected to the auxiliary winding N3 of the leakage transformer LT1 and one filament (b) of the discharge lamp La1. A parallel circuit of a capacitor C8 and a resistor R5 is connected in series with resistors R3 and R4 between the ground and the connection point of the auxiliary winding N3 and the filament (c) of the discharge lamp La2. Further, the switching element Q2 has its gate connected through a triggering element TD such as Diac to the connection point of resistor R4 and capacitor C8, while a series circuit of a diode D11 and a resistor R10 is inserted between the drain of the switching element Q2 and the connection point of resistor R4 and capacitor C8. A series combination of the triggering element TD, diode D11 and resistor R10 constitutes a starting circuit for turning on the switching element Q2 when the AC source voltage AC is applied so as to start the inverter. The like peak detection circuit P as explained with reference to the fifth embodiment is connected to the point between resistors R3 and R4 to derive a detected voltage Vk from the connection point.

When the AC source voltage is applied, the rectifier DB charge capacitor C8 through resistor R1, filament (b) of discharge lamp La1, filament (c) of discharge lamp La2, and resistors R3 and R4. When voltage across capacitor C8 increases to the break voltage of the triggering element TD, the triggering element responds to break-down for supplying the charge of capacitor C8 to the gate of switching element Q2, thereby turning on switching element Q2 and therefore starting the inverter circuit. When the switching element Q2 is turned on, capacitor C8 is discharged through diode D11, resistor R10 and switching element Q2 so that the inverter circuit continues to oscillate. If the filament (b) of the discharge lamp La1 or the filament (c) of the discharge lamp La2 is broken, or if anyone of the discharge lamps La1 and La2 is disconnected (in no-load condition) at the time of emerging the device, no charging path is established for capacitor C8. Consequently, in view of that capacitor C8 is shunt by resistor R5, the triggering element TD would not break-down and therefore the inverter circuit would not start. Thus, the inverter circuit is prevented from starting at the no-load condition for protection of the circuit at the no-load condition.

As explained in the above, since the starting circuit for the inverter circuit of the present embodiment includes the no-load detecting and circuit protective function of dealing with the broken filaments and the disconnection of the discharge lamps La1 and La2, in addition to the abnormality detection and protection function of dealing with the depletion of the emitter, the circuit components can be reduced significantly in number.

(Eighth Embodiment)

Figure 17:
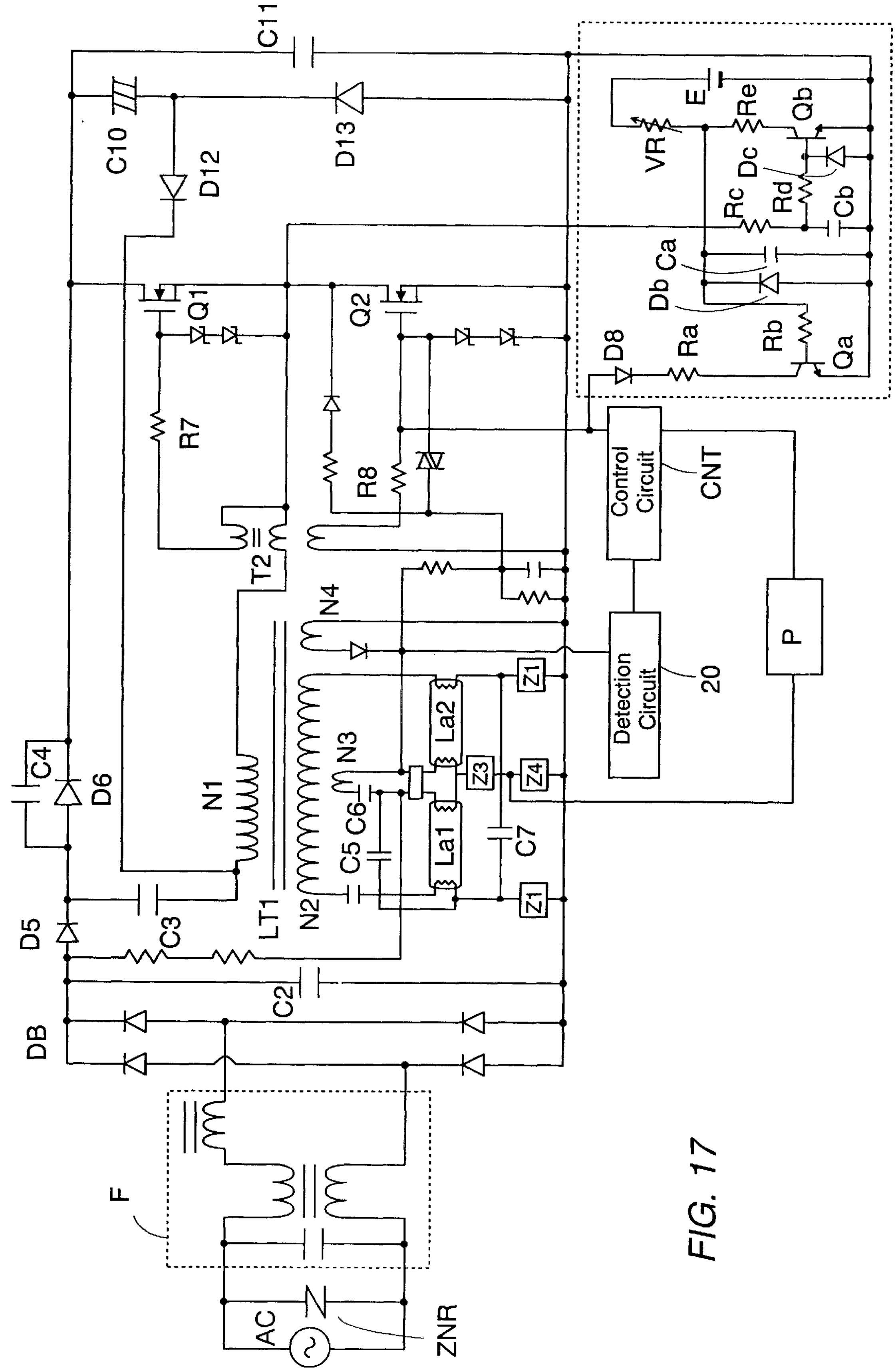
FIG. 17 is a partly omitted schematic circuit diagram showing a discharge lamp driving device in accordance with an eighth embodiment of the present invention.
Figure 18:
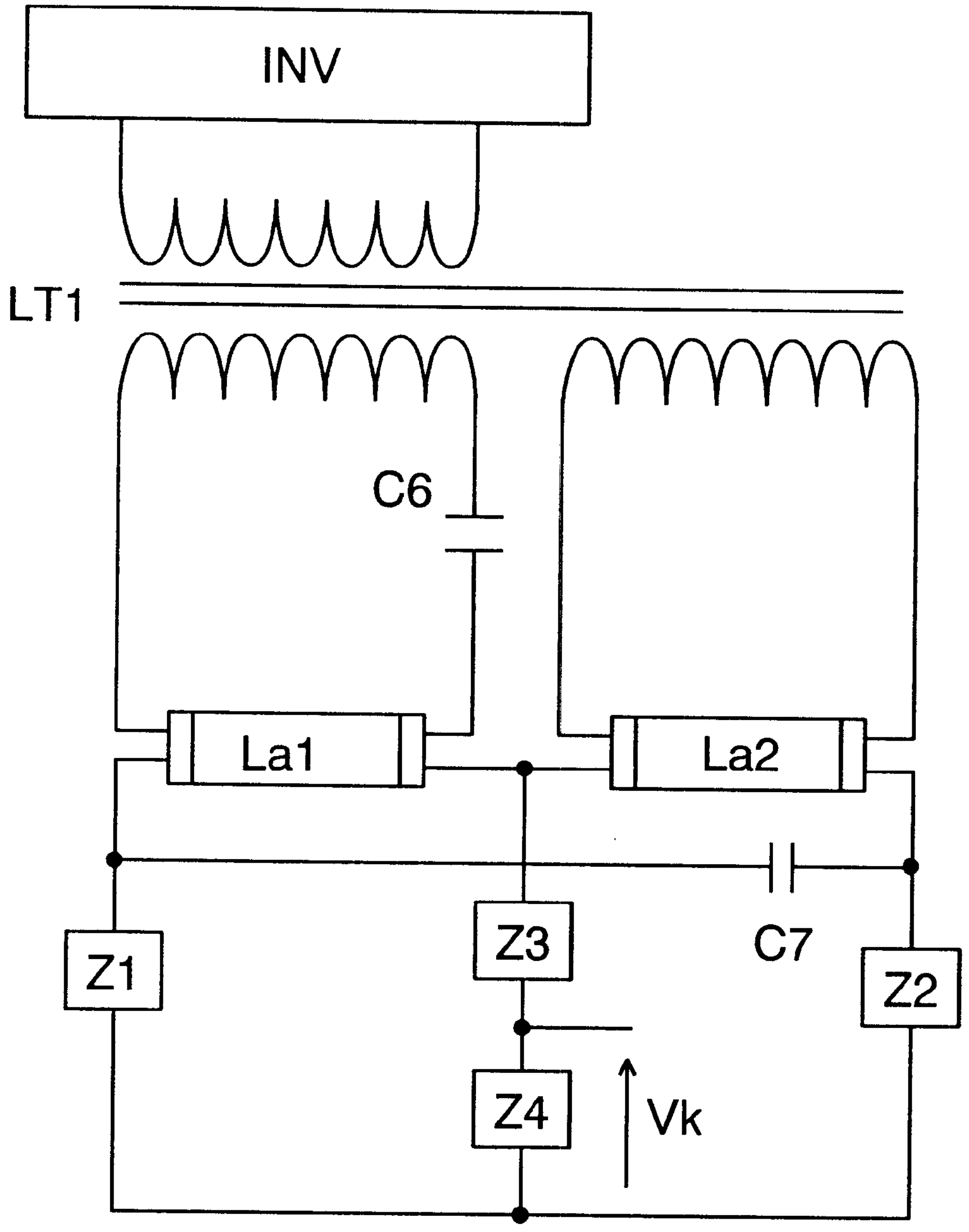
FIG. 18 is a circuit diagram of a principal portion of the above device.

FIG. 17 shows a schematic circuit diagram of the discharge lamp driving device in accordance with the present embodiment, while FIG. 18 shows a circuit diagram about a principal portion of the above. A basic configuration of the present embodiment is identical to the second prior art of FIG. 2 as well as to the seventh embodiment. Therefore no duplicate explanation is made herein but the like parts are designated by the like reference numerals. Here, only the characterizing features of the present embodiment will be now explained.

The present embodiment is configure to insert impedance elements Z1 and Z1 respectively between the filament (a) of the discharge lamp La1 and the ground and between the filament (c) of the discharge lamp La2, and insert a series combination of impedance elements Z3 and Z4 between the ground and the connection point of the auxiliary winding N3 and the filament (c) of the discharge lamp La2. Also, the like peak detection circuit P as explained with reference to the fifth embodiment is connected to a connection point of the impedance elements Z3 and Z4 so that the detected voltage Vk derived from the connection point of the impedance elements Z3 and Z4 is converted into a DC detected voltage Vk', The control circuit CNT compares the detected voltage Vk' from the peak detection circuit P with a predetermined threshold Vth so as to judge that the discharge lamp La1 or La2 reaches the lamp life end when the threshold Vth is exceeded, and makes the protective action of intermittently oscillating the inverter circuit.

Thus, in the like manner as in the first embodiment, the present embodiment includes the impedance elements Z1 and Z2 which are inserted respectively between the one filament of the one discharge lamp La1 and the node having no high frequency amplitude (the ground), and between the one filament of the other discharge lamp La2 and the ground, in order to detect a difference in the AC component of the lamp voltages VLa1 and VLa2 of the discharge lamps La1 and La2 within the closed loops each including the impedance element Z1 and each of the discharge lamps La1 and La2, for the purpose of judging the abnormality due to the depletion of the emitter. Accordingly, it can be made to reliably judge the abnormality irrespective of the varying amplitudes of the lamp voltage VLa1 and VLa2 from low to high temperature environments. Also, since there is no need to include a DC blocking capacitor on the side of the secondary winding N2 of the leakage transformer LT1, no DC component is applied to the discharge lamps La1 and La2 so as to prevent the cataphoresis phenomenon.

(Ninth Embodiment)

Figure 19:
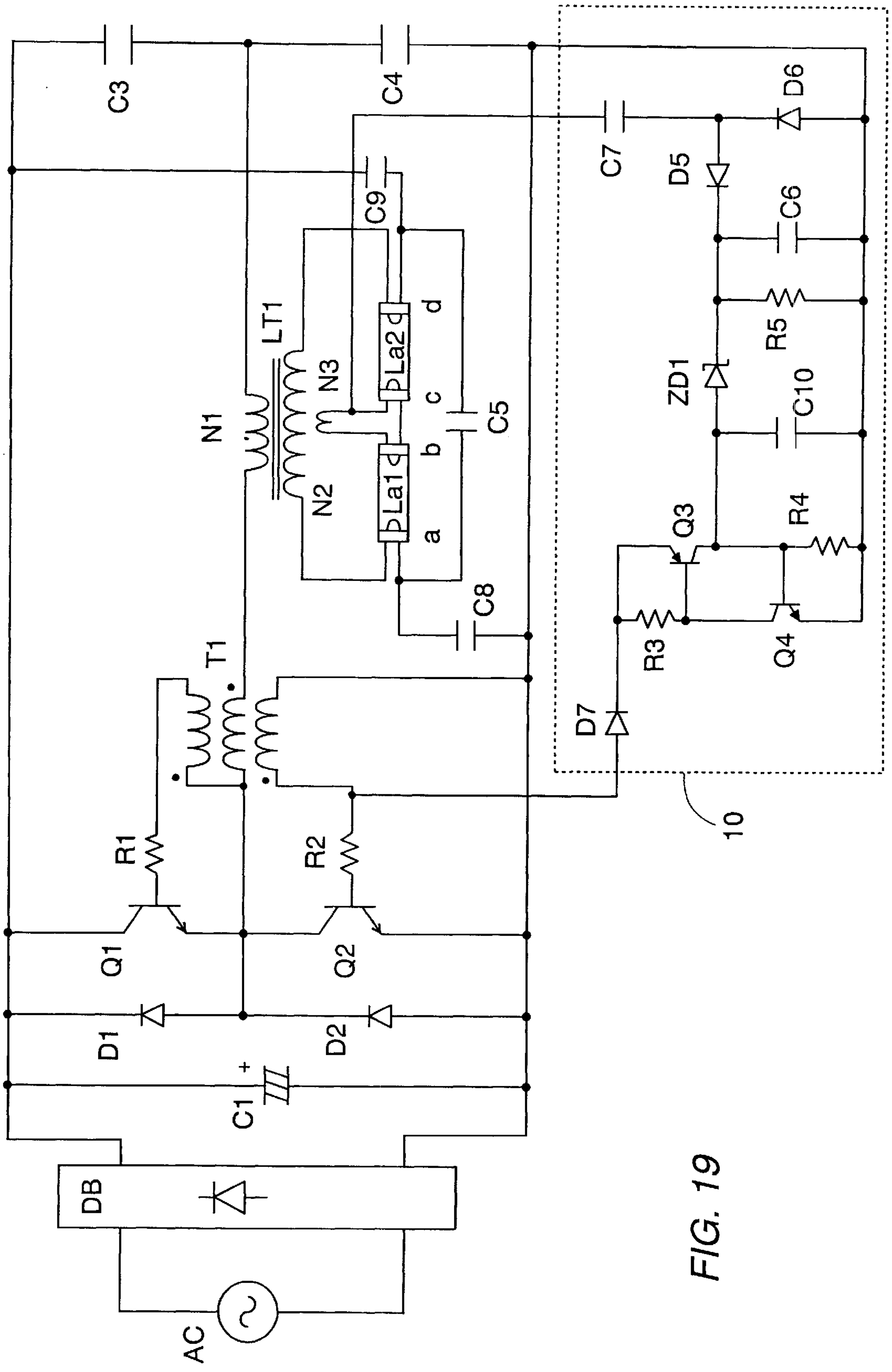
FIG. 19 is a schematic circuit diagram showing a discharge lamp driving device in accordance with a ninth embodiment of the present invention.

FIG. 19 shows a schematic circuit diagram of the discharge lamp driving device in accordance with the present embodiment. The present embodiment includes a rectifier DB in the form of a diode bridge responsible for a full-wave rectification of an AC source voltage AC to provide a pulsating output that is smoothed by a smoothing capacitor C1 to give a voltage source for an inverter circuit. The inverter circuit is of a so-called half-bridge configuration and includes a series combination of switching elements Q1 and Q2 respectively in the form of bipolar transistors connected across the smoothing capacitor C1, diodes D1 and D2 each connected in anti-parallel relation across each of the switching elements Q1 and Q2, and a series circuit of capacitors C3 and C4 connected across the smoothing capacitor C1. Connected to a point between capacitors C3 and C4 is a series circuit of a primary winding N1 of a leakage transformer LT1 and a primary winding of a driving transformer T1 which is provided for driving the switching elements Q1 and Q2. The leakage transformer LT1 has a secondary winding N2 connected to filaments (a) and (d) of the discharge lamps La1 and La2, and an auxiliary winding N3 connected to filaments (b) and (c) of the discharge lamps La1 and La2. A resonant inducing capacitor C5 is connected to filaments (a) and (d) of the discharge lamps La1 and La2 on the non-energized side thereof. Instead of using the combination of the bipolar transistors and the diodes D1 and D2, the switching elements Q1 and Q2 may be realized by field effect transistors having parasitic diodes.

The switching elements Q1 and Q2 are activated by the driving transformer T1 to turn on and off alternately with the switching elements Q1 and Q2 being responsible for flowing currents in opposite directions through the leakage transformer LT1 to the discharge lamps La1 and La2 respectively from capacitors C3 and C4, thereby applying a high frequency voltage developed across capacitor C5 resulting from a series resonant circuit of a leakage inductance and capacitor C5 for starting and operating the lamps.

Also in the present embodiment, a capacitor C8 is inserted as the impedance element between the filament (a) of the discharge lamp La1 and a node (the ground) having no high frequency amplitude, while a capacitor C9 is inserted as the impedance element between the filament (b) of the discharge lamp La2 and the node (the high-side output terminal of rectifier DB). Further, an emitter depletion detection and protection circuit 10 is connected between a connection of a base resistor R2 of the switching element Q2 with the secondary winding of the driving transformer T1 and the auxiliary winding N3 in order to detect the depletion of emitter in anyone of the filaments (a) to (d) of the discharge lamps La1 and La2 for protection of the circuit.

The emitter depletion detection and protection circuit 10 includes a series circuit of a DC blocking capacitor C7 and a diode D6 connected between the filament (c) of the discharge lamp La2 and the ground, a diode D5 having an anode connected to a cathode of diode D6 connected to the capacitor C7, a zener diode ZD1 having a cathode connected to the cathode of diode D5, and a parallel combination of a smoothing capacitor C6 and a discharging resistor R5 connected between the cathode of zener diode ZD1 and the ground. A capacitor C10 is connected in parallel with a biasing resistor R4 between the anode of zener diode ZD1 and the ground, while a switching element Q3 of PNP-type bipolar transistor is connected in series with a diode D7 between the base resistor R2 of the switching element Q2 and the resistor R4. Further, a biasing resistor R3 is connected in an emitter-base path of the switching element Q3, while a switching element Q4 of NPN-type bipolar transistor is connected between resistor R3 and the switching element Q4.

As the capacitor C8 is inserted between the filament (a) of the discharge lamp La1 and the ground and the capacitor C9 is inserted between the filament (d) of the discharge lamp La2 and the high-side output terminal of the rectifier DB, the high frequency currents respectively flowing through the discharge lamps La1 and La2 becomes asymmetrical with each other if anyone of the filaments (a) to (d) of the discharge lamps La1 and La2 sees the depletion of the emitter. The resulting asymmetrical high frequency currents are responsible for charging the capacitor C7 and the capacitor C6 through diode D5. When the voltage across capacitor C6 exceeds the zener voltage of zener diode ZD1, capacitor C6 is discharged to turn on the switching element Q4, which in turn causes the switching element Q3 to turn on, thereby connecting the secondary winding of the driving transformer T1 for driving the switching element Q2 to the ground through diode D7. With this result, the switching element Q2 becomes not capable of turning on to stop the inverter circuit. Thus, the emitter depletion detection and protection circuit 10 can detect the depletion of the emitter of the discharge lamps La1 and La2, and stops the inverter circuit for protection of the circuit upon detection of the depletion of the emitter.

In the present embodiment, the impedance elements C8 and C9 are inserted respectively between the filaments of the discharge lamps La1, La2 and the nodes having no high frequency amplitude (the ground or the high-side output terminal of rectifier DB) in order to detect the asymmetric high frequency currents at the connection between the discharge lamps La1 and La2 for judging whether there occurs the depletion of emitter. Therefore, it is possible to reliably judge the occurrence of the depletion of the emitter irrespective of whether it is operating in the low or high temperature environment. Further, since there is no need to connect a DC blocking capacitor to the secondary winding N2 of the leakage transformer LT1, the discharge lamps La1 and La2 can be free from the DC component so as to be prevented from causing the cataphoresis phenomenon.

Figure 20:
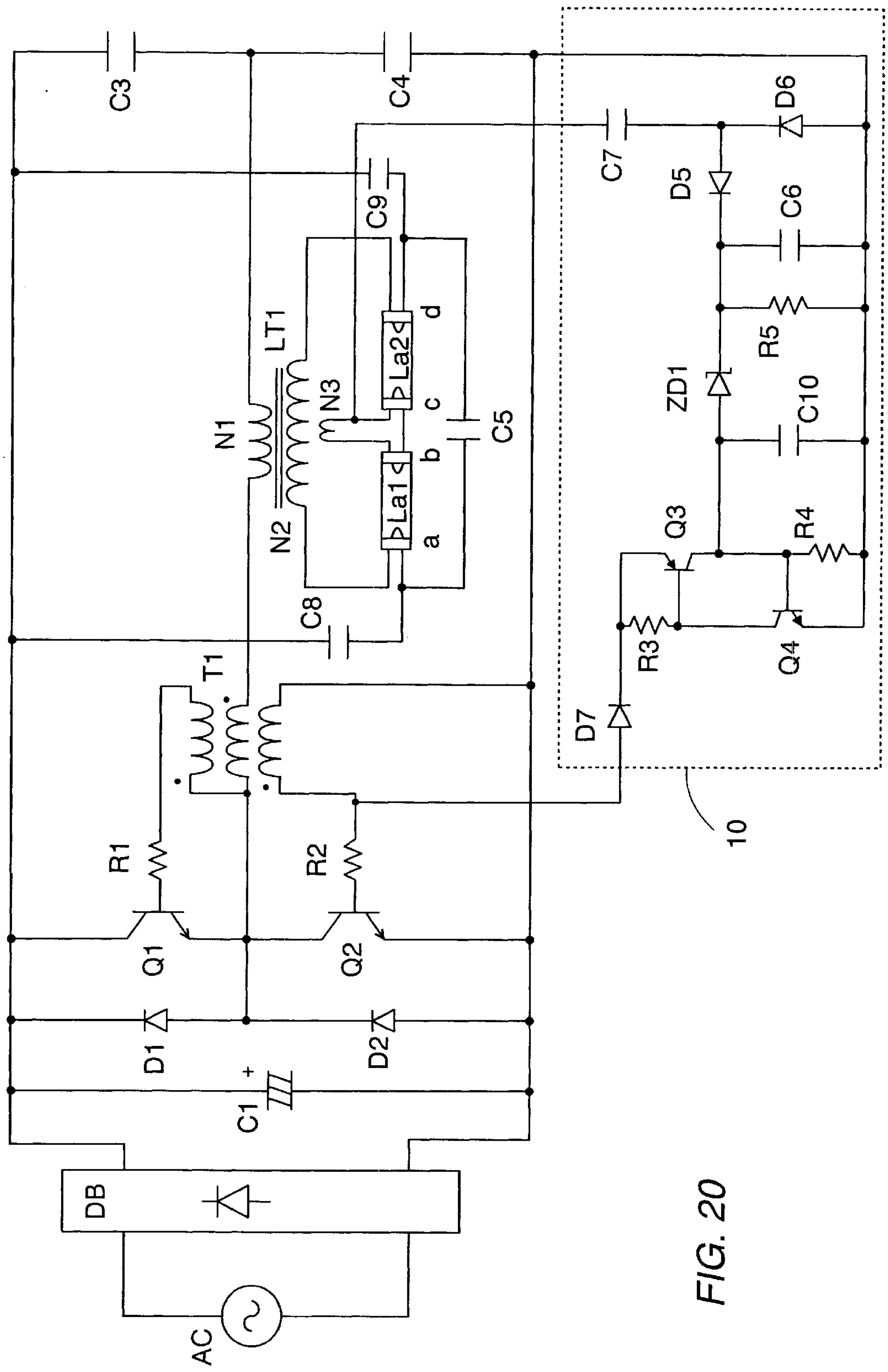
FIG. 20 is a schematic circuit diagram showing a modification of the above device.
Figure 21:
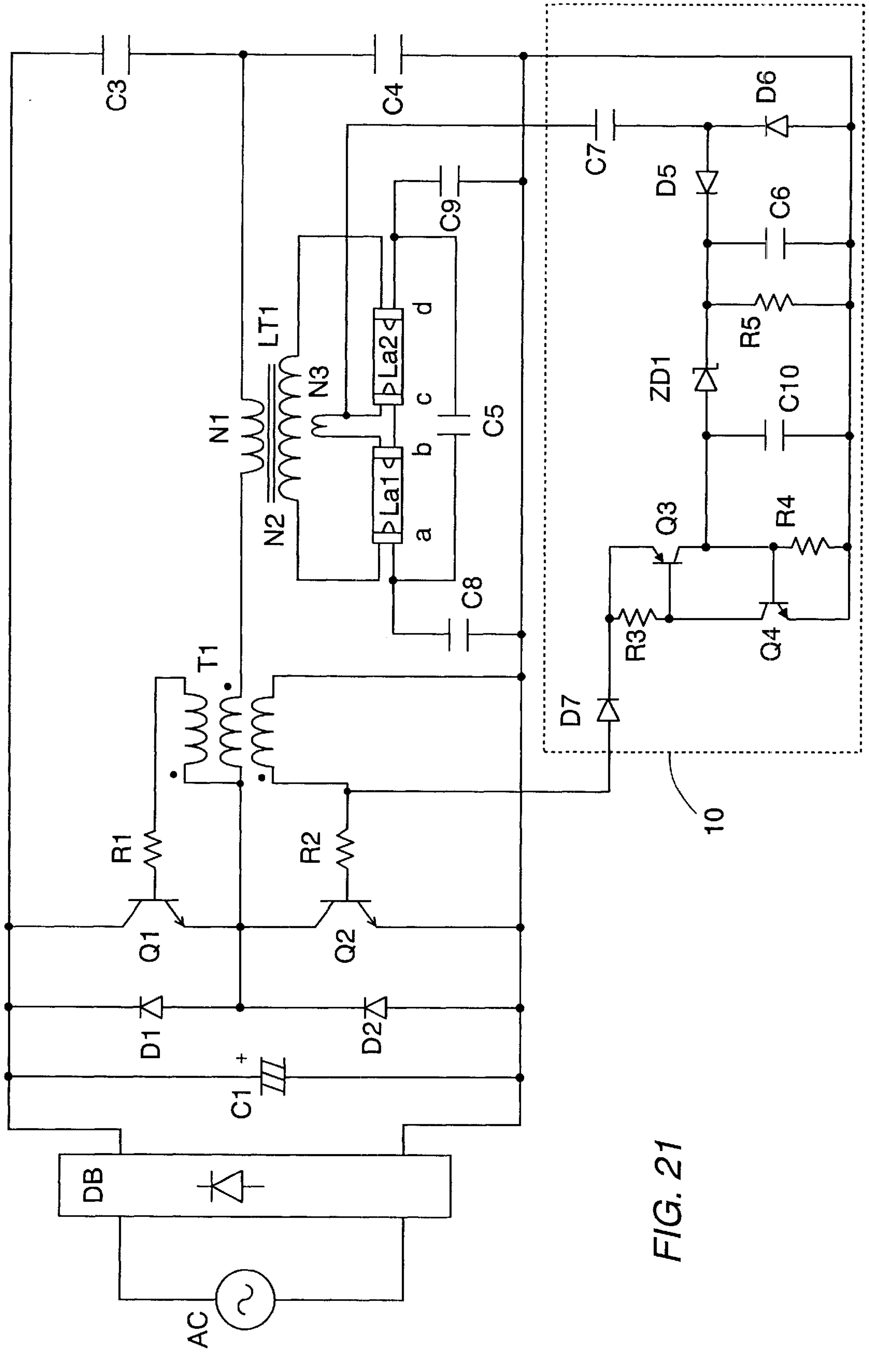
FIG. 21 is a schematic circuit diagram showing another modification of the above device.
Figure 22:
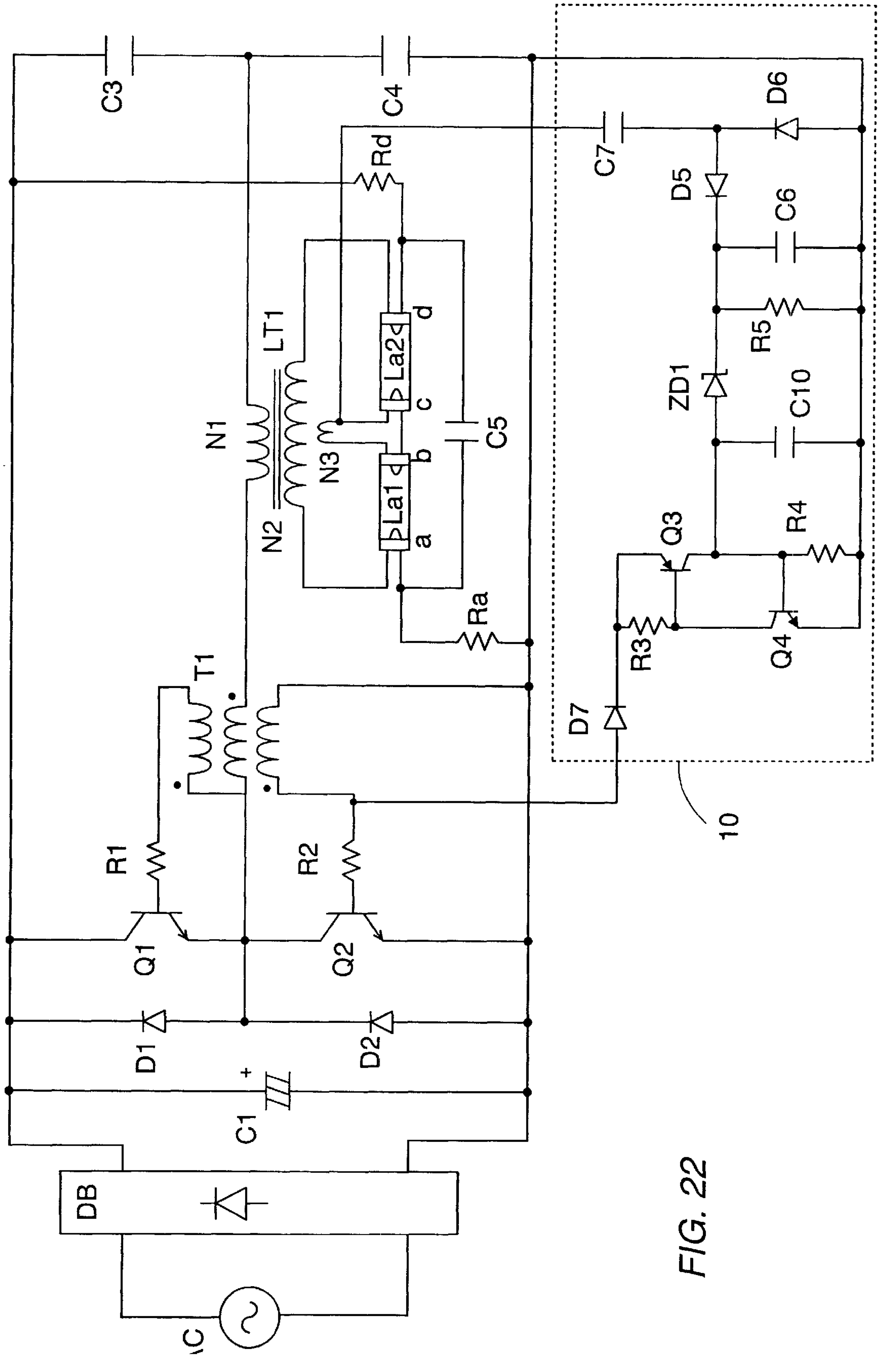
FIG. 22 is a schematic circuit diagram showing a further modification of the above device.

It may be equally possible to insert capacitors C8 and C9 respectively between the filament (a) of the discharge lamp La1 and the high-side output terminal of the rectifier DB, and between the filament (d) of the discharge lamp La2 and the high-side output terminal, as shown in FIG. 20; to insert capacitors C8 and C9 respectively between the filament (a) of the discharge lamp La1 and the ground, and between the filament (d) of the discharge lamp La2 and the ground, as shown in FIG. 21; to insert resistors Ra and Rd instead of capacitors C8 and C8 between the respective filaments (a) and (d) of the discharge lamps La1 and La2 and the respective one of the high-side output terminal of rectifier DB and the ground, as shown in FIG. 22; or even to use a series combination of resistor and capacitor as the impedance element. In any case, the high frequency currents flowing through the discharge lamps La1 and La2 becomes asymmetrical with each other when there occurs the depletion of the emitter in anyone of the filaments (a) to (d) of the discharge lamps La1 and La2 so that the emitter depletion detection and protection circuit 10 can responds to detect the asymmetrical high frequency currents for judging whether or not there occurs the depletion of the emitter.

(Tenth Embodiment)

Figure 23:
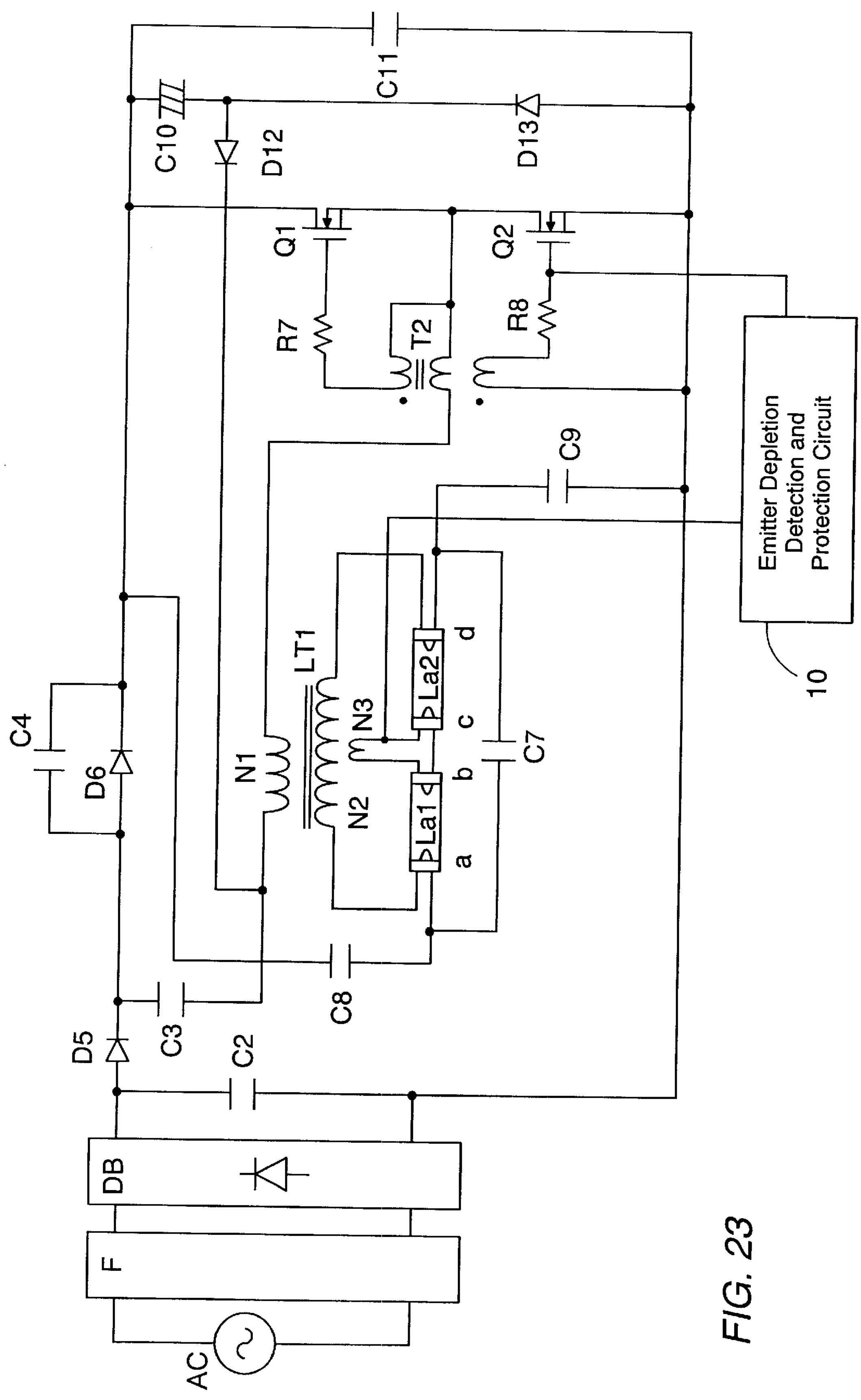
FIG. 23 is a schematic circuit diagram showing a discharge lamp driving device in accordance with a tenth embodiment of the present invention.

FIG. 23 shows a schematic circuit diagram of the discharge lamp driving device in accordance with the present embodiment which is basically similar to the second prior art of FIG. 2. Therefore, like configuration common to the second prior art is not shown and no duplicate explanation is made herein. Like parts are designated by like reference numerals. Here, only the characterizing features of the present embodiment will be now explained.

In the present embodiment, capacitor C8 is inserted as the impedance element between the filament (a) of the discharge lamp La1 and the node (the high-side output terminal of rectifier DB) having no high frequency amplitude, while capacitor C9 is inserted as the impedance element between the filament (d) of the discharge lamp La2 and the node (ground). Also, connected between the gate of the switching element Q2 and the auxiliary winding N3 is the like emitter depletion detection and protection circuit 10 which detects the depletion of the emitter in anyone of the filaments (a) to (d) of the discharge lamps La1 and La2 for protection of the circuit. The emitter depletion detection and protection circuit is identical in configuration and operation to that of the ninth embodiment, and therefore no duplication explanation is made.

Similar to the ninth embodiment, the present embodiment is configured to insert capacitor C8 between the filament (a) of the discharge lamp La1 and the high-side output terminal of rectifier DB, to insert capacitor C9 between the filament (d) of the discharge lamp La2 and the ground, and to provide the emitter depletion detection and protection circuit 10 which detects the asymmetric high frequency currents at the connection between the discharge lamps La1 and La2 for judging whether there occurs the depletion of the emitter. Therefore, it is possible to reliably judge the occurrence of the depletion of the emitter irrespective of whether it is operating in the low or high temperature environment. Further, since there is no need to connect a DC blocking capacitor to the secondary winding N2 of the leakage transformer LT1, the discharge lamps La1 and La2 can be free from the DC component so as to be prevented from causing the cataphoresis phenomenon.

The inverter circuit may be of different circuit configurations including, for example, one in which the resonant load circuit is connected between the connection point of the switching elements Q1 and Q2 and the low-side output terminal of the rectifier DB, and one in which a valley-filling power source composed of a voltage doubler is utilized instead of the valley-filling power source composed of the step-down chopper circuit. The concept of the present invention can be applied It is noted that the concept of the present invention can be applied to various circuit configurations of the inverter circuit. For example, the inverter circuit may be of different configurations including one in which the resonant load circuit is connected between the connection point of the switching elements Q1 and Q2 and the low-side output terminal of the rectifier DB, and one in which a valley-filling power source composed of a voltage doubler is utilized instead of the valley-filling power source composed of the step-down chopper circuit.

What is claimed is:

1. A discharge lamp driving device comprising:

a rectifier which rectifies an AC source voltage;

a smoothing capacitor which smoothes out a pulsating output of the rectifier;

an inverter circuit having at least one switching element for conversion of the smoothed DC output made through the smoothing capacitor into a high frequency output;

a load circuit including a resonance circuit and a discharge lamp and being supplied with the high frequency output from the inverter circuit;

an output transformer having a primary connected to an output end of the inverter circuit and having a secondary connected to one filament end of the discharge lamp;

an impedance element inserted respectively between the other filament end of the discharge lamp and a node having no high frequency amplitude; and an abnormality detection and protection means which detects an amplitude of the high frequency output flowing through the discharge lamp and the impedance element in order to make a circuit protection when the detected amplitude exceeds a predetermined threshold.

2. The discharge lamp driving device as set forth in claim 1, wherein a plurality of said discharge lamps are connected in series across the secondary of said output transformer, the impedance element being inserted between the other filament of at least one of said discharge lamps and the positive side input terminal of the inverter circuit, and another impedance element being inserted between the other filament end of at least another said discharge lamp and the grounded input terminal or output terminal of the inverter circuit.

3. The discharge lamp driving device as set forth in claim 1, wherein a plurality of said discharge lamps are connected in series across the secondary of said output transformer, said abnormality detection and protection means making the circuit protection when the amplitude of the high frequency output flowing at least one of said discharge lamps and the impedance element exceeds a predetermined threshold.

4. The discharge lamp driving device as set forth in claim 1, wherein a plurality of said discharge lamps are connected in series across the secondary of said output transformer, said abnormality detection and protection means detecting the amplitude of the voltage at the connection between the filaments of the individual discharge lamps, detecting the amplitude of the high frequency output flowing through at least one of said discharge lamps and the impedance element, and making the circuit protection when at least one of said amplitudes exceeds a predetermined threshold.

5. The discharge lamp driving device as set forth in claim 1, wherein a plurality of said discharge lamps are connected in series across the secondary of said output transformer, said abnormality detection and protection means detecting the amplitude of the voltage at the connection between the filaments of the individual discharge lamps, and making the circuit protection when at the amplitude at said connection or an amplitude of a high frequency output flowing through at least one of the high-voltage and low-voltage side discharge lamps and through the impedance element exceeds a predetermined threshold.

6. The discharge lamp driving device as set forth in claim 1, wherein said impedance element is a resistor.

7. The discharge lamp driving device as set forth in claim 1, wherein said impedance element is a capacitor.

8. The discharge lamp driving device as set forth in claim 1, wherein said impedance element is a series combination of a resistor and a capacitor.

9. The discharge lamp driving device as set forth in claim 1, wherein said inverter circuit is of a self-excited type, and a starting circuit for starting the inverter circuit shares at least a portion thereof with said abnormality detection and protection means.

10. The discharge lamp driving device as set forth in claim 1, wherein said impedance element is shared with a resonant circuit included in the load circuit.

11. The discharge lamp driving device as set forth in claim 1, wherein a plurality of said discharge lamps are connected in series across the secondary of said output transformer.

12. The discharge lamp driving device as set forth in claim 11, wherein the impedance elements inserted between the filaments of the respective discharge lamps and the node having no high frequency amplitude have substantially the same impedance value.

13. The discharge lamp driving device as set forth in claim 1, wherein said impedance element is inserted between said other filament end of the discharge lamp and a positive side input terminal of the inverter circuit.

14. The discharge lamp driving device as set forth in claim 13, wherein a plurality of said discharge lamps are connected in series across the secondary of said output transformer.

15. The discharge lamp driving device as set forth in claim 14, wherein the impedance elements inserted between the filaments of the respective discharge lamps and the node having no high frequency amplitude have substantially the same impedance value.

16. The discharge lamp driving device as set forth in claim 1, wherein said impedance element is inserted between said other filament end of the discharge lamp and a grounded input terminal or output terminal of the inverter circuit.

17. The discharge lamp driving device as set forth in claim 16, wherein a plurality of said discharge lamps are connected in series across the secondary of said output transformer.

18. The discharge lamp driving device as set forth in claim 17, wherein the impedance elements inserted between the filaments of the respective discharge lamps and the node having no high frequency amplitude have substantially the same impedance value.

* * * * *